United States Patent
Xu et al.

(10) Patent No.: US 12,425,631 B2
(45) Date of Patent: *Sep. 23, 2025

(54) ADAPTIVE PARAMETER SELECTION FOR CROSS-COMPONENT PREDICTION IN IMAGE AND VIDEO COMPRESSION

(71) Applicant: Tencent America LLC, Palo Alto, CA (US)

(72) Inventors: Xiaozhong Xu, Shenzhen (CN); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/678,979

(22) Filed: May 30, 2024

(65) Prior Publication Data

US 2024/0323423 A1    Sep. 26, 2024

Related U.S. Application Data

(63) Continuation of application No. 17/976,556, filed on Oct. 28, 2022, now Pat. No. 12,041,260.

(Continued)

(51) Int. Cl.
*H04N 19/50* (2014.01)
*H04N 19/176* (2014.01)
(Continued)

(52) U.S. Cl.
CPC ........... *H04N 19/50* (2014.11); *H04N 19/176* (2014.11); *H04N 19/186* (2014.11); *H04N 19/44* (2014.11)

(58) Field of Classification Search
CPC .... H04N 19/105; H04N 19/11; H04N 19/176; H04N 19/186; H04N 19/44; H04N 19/50; H04N 19/70
(Continued)

(56) References Cited

U.S. PATENT DOCUMENTS

| 11,196,998 B2 | 12/2021 | Onno et al. |
| 12,041,260 B2 * | 7/2024 | Xu ......... H04N 19/186 |
| 2021/0289215 A1 * | 9/2021 | Helmrich ...... H04N 19/136 |

FOREIGN PATENT DOCUMENTS

WO    2023/084155 A1    5/2023

OTHER PUBLICATIONS

Lainema et al. "AHG12: Slope adjustment for CCLM", Joint Video Experts Team (JVET) of ITU-T SG 16 WP 3 and ISO/IEC JTC 1/SC 29, 25th Meeting, by teleconference, Jan. 12-21, 2022, Document: JVET-Y0055-v1, pp. 1-3.

(Continued)

*Primary Examiner* — Kathleen M Walsh
(74) *Attorney, Agent, or Firm* — ArentFox Schiff LLP

(57) ABSTRACT

A method and an apparatus including processing circuitry for video processing are provided. For a first region in a chroma block in a current picture, the processing circuitry is configured to update an offset parameter in a cross-component linear model (CCLM) mode based on a first subset of reconstructed samples in a luma block that is collocated with the chroma block in the current picture. The first subset of the reconstructed samples does not include one or more reconstructed samples in the luma block. The processing circuitry is configured to update a slope parameter in the CCLM mode based on a second subset of the reconstructed samples in the luma block and encode the first region in the chroma block based on the updated offset parameter and the updated slope parameter using the CCLM mode.

20 Claims, 19 Drawing Sheets

Related U.S. Application Data

(60) Provisional application No. 63/305,159, filed on Jan. 31, 2022.

(51) Int. Cl.
*H04N 19/186* (2014.01)
*H04N 19/44* (2014.01)

(58) Field of Classification Search
USPC .................................................. 375/240.12
See application file for complete search history.

(56) References Cited

OTHER PUBLICATIONS

Pfaff et al., "Intra prediction and mode coding in VVC", IEEE Transactions on Circuits and Systems for Video Technology, vol. 31, No. 10, Oct. 2021, pp. 3834-3847.

\* cited by examiner

ADAPTIVE PARAMETER SELECTION FOR CROSS-COMPONENT PREDICTION IN IMAGE AND VIDEO COMPRESSION

INCORPORATION BY REFERENCE

This application is a continuation of U.S. application Ser. No. 17/976,556, filed on Oct. 28, 2022, which claims the benefit of priority to U.S. Provisional Application No. 63/305,159, "ADAPTIVE PARAMETER SELECTION FOR CROSS-COMPONENT PREDICTION IN IMAGE AND VIDEO COMPRESSION" filed on Jan. 31, 2022. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes receiving circuitry and processing circuitry. The processing circuitry decodes prediction information of a chroma block to be reconstructed in a current picture. The prediction information indicates that a cross-component linear model (CCLM) mode is applied to the chroma block. For a first region in the chroma block, a first adjustment parameter used to adjust an offset parameter in the CCLM mode can be determined based on a first subset of reconstructed samples in a collocated luma block in the current picture. The first subset of the reconstructed samples does not include one or more samples in the collocated luma block. A first updated offset parameter of the first region in the chroma block can be determined based at least on the offset parameter and the first adjustment parameter. The first region in the chroma block can be reconstructed based at least on the first updated offset parameter using the CCLM mode.

In an example, the first region in the chroma block includes the entire chroma block. The first subset of the reconstructed samples in the collocated luma block is one sample in the collocated luma block. The first adjustment parameter can be determined to be a sample value of the one sample in the collocated luma block.

In an example, the first region includes the entire chroma block. The first subset of the reconstructed samples includes a plurality of samples in the collocated luma block. The first adjustment parameter can be determined to be an average of sample values of the plurality of samples in the collocated luma block.

In an example, the first region includes the entire chroma block. The prediction information further indicates which of the samples in the collocated luma block is included in the first subset of the reconstructed samples.

In an example, the chroma block further includes a second region. The first subset of the reconstructed samples is a first sample in the collocated luma block. For the second region in the chroma block, a second adjustment parameter used to adjust the offset parameter in the CCLM mode can be determined based on a second sample in the collocated luma block. In an example, the second sample is different from the first sample. A second updated offset parameter of the second region can be determined based at least on the offset parameter and the second adjustment parameter. The second region in the chroma block can be reconstructed based at least on the second updated offset parameter using the CCLM mode.

In an example, the collocated luma block includes a first luma region and a second luma region that are collocated with the first region and the second region in the chroma block, respectively. The first subset of the reconstructed samples includes a plurality of samples in the first luma region. For the second region in the chroma block, a second adjustment parameter used to adjust the offset parameter in the CCLM mode can be determined based on a plurality of samples in the second luma region. A second updated offset parameter of the second region can be determined based at least on the offset parameter and the second adjustment parameter. The second region in the chroma block can be reconstructed based at least on the second updated offset parameter using the CCLM mode.

In an example, the first subset of the reconstructed samples includes a top-left sample, a top-right sample, a bottom-left sample, and a bottom-right sample in the first luma region. The first adjustment parameter can be determined to be an average of the top-left sample, the top-right sample, the bottom-left sample, and the bottom-right sample in the first luma region. For the second region in the chroma block, a second adjustment parameter used to adjust the offset parameter in the CCLM mode can be determined to be an average of a top-left sample, a top-right sample, a bottom-left sample, and a bottom-right sample in the second luma region. A second updated offset parameter of the second region can be determined based at least on the second offset parameter and the second adjustment parameter. The second region in the chroma block can be reconstructed based at least on the second updated offset parameter using the CCLM mode.

In an example, for the first region, an updated scaling parameter can be determined to be a sum of a scaling parameter used in the CCLM mode and an adjustment parameter used to adjust the scaling parameter. The first updated offset parameter can be determined to be $(b - u \times y_r)$ where b is the offset parameter, u is the adjustment parameter used to adjust the scaling parameter, and $y_r$ is the first adjustment parameter. The first region in the chroma block can be reconstructed based on the first updated offset parameter and the updated scaling parameter using the CCLM mode.

In an example, for the first region, the adjustment parameter used to adjust the scaling parameter is determined based on (i) reconstructed luma samples in one or more neighboring luma blocks of the collocated luma block and (ii) samples in the collocated luma block.

In an example, for the first region, the adjustment parameter used to adjust the scaling parameter is determined based on a difference between an average of the reconstructed luma samples in the one or more neighboring luma blocks and an average of the samples in the collocated luma block.

In an embodiment, for a first region in the chroma block, the processing circuitry determines a first adjustment value used to modify an offset parameter in the CCLM mode based on a first subset of reconstructed samples in a luma block that is collocated with the chroma block in the current picture. The first subset of the reconstructed samples does not include one or more samples in the luma block. The processing circuitry updates the offset parameter based at least on the first adjustment value. The processing circuitry determines a second adjustment value used to modify a slope parameter in the CCLM mode based on a second subset of the reconstructed samples in the luma block and updates the slope parameter based at least on the second adjustment value. The processing circuitry can reconstruct the first region in the chroma block based at least on the updated offset parameter and the updated slope parameter using the CCLM mode.

In an example, the second subset of the reconstructed samples includes the first subset of the reconstructed samples.

In an example, the processing circuitry determines the second adjustment value based on the reconstructed samples in the entire luma block.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1A:
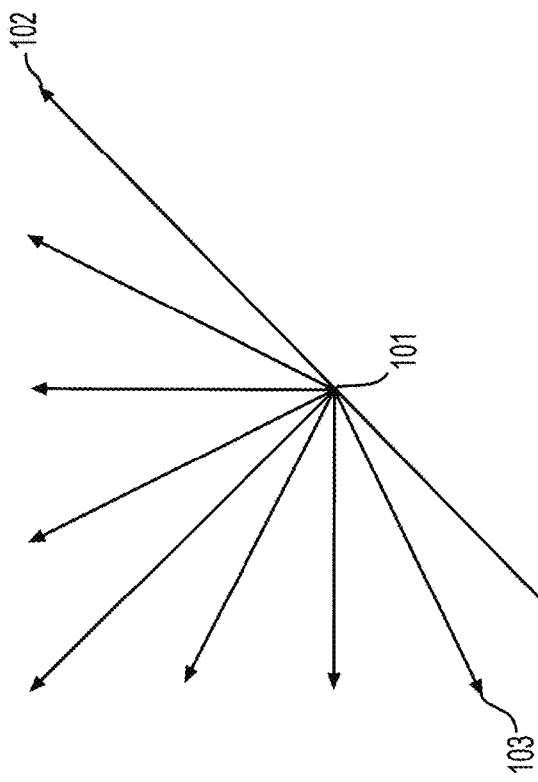
FIG. 1A is a schematic illustration of an exemplary subset of intra prediction modes.
Figure 1B:
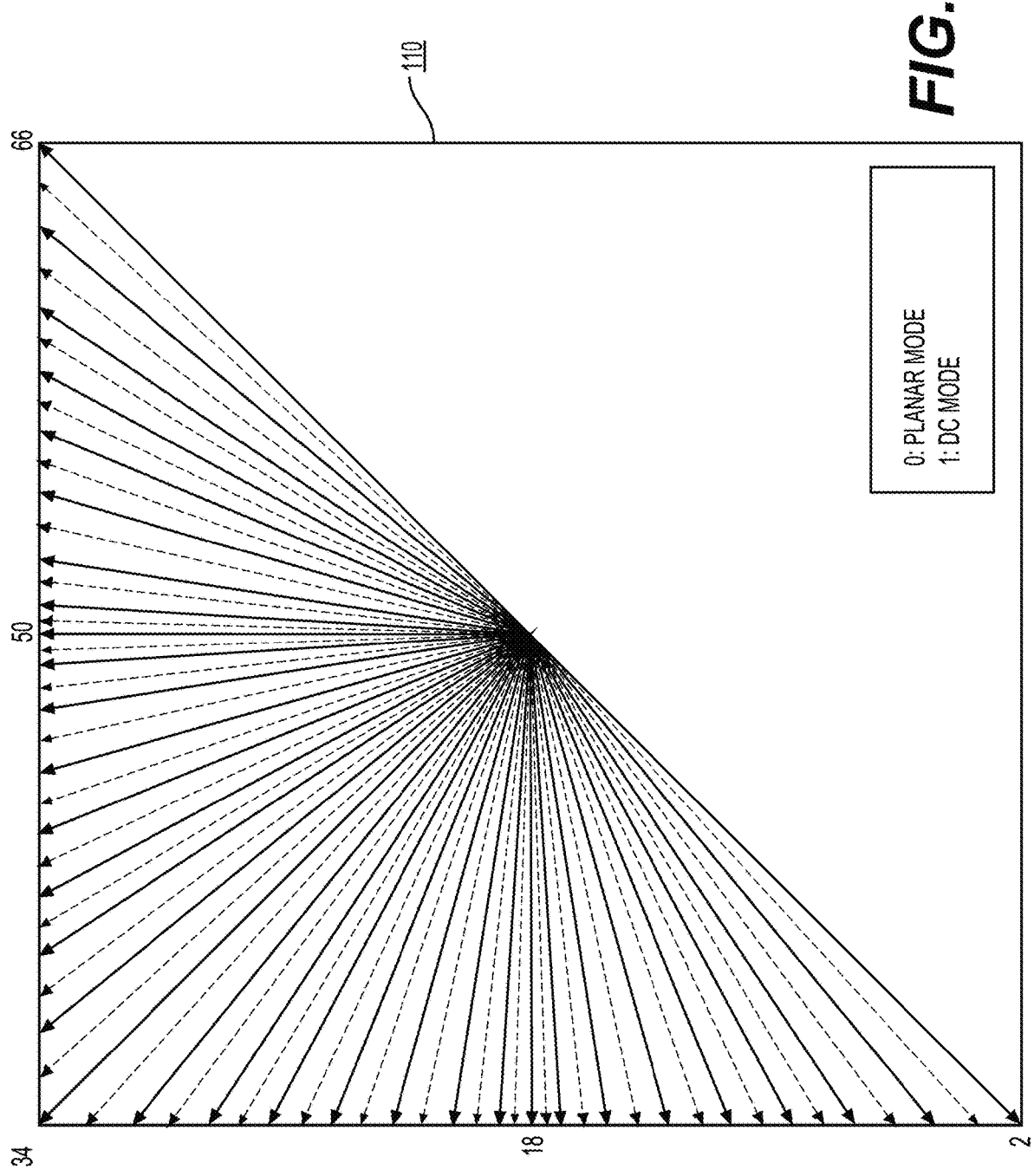
FIG. 1B is an illustration of exemplary intra prediction directions.
Figure 2:
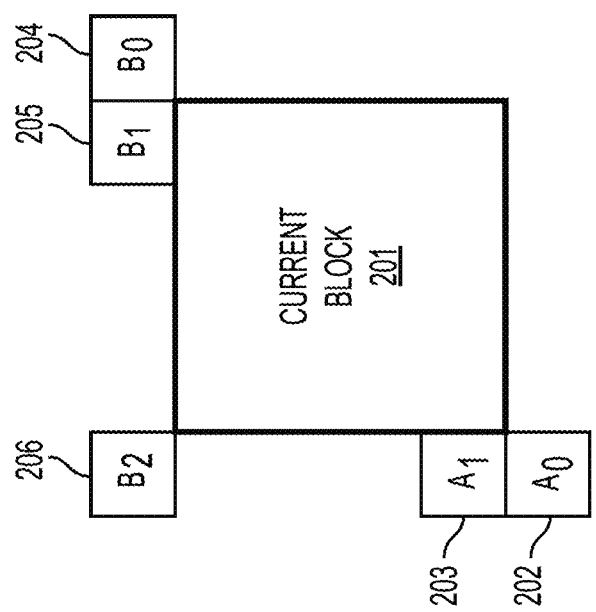
FIG. 2 shows an example of a current block (201) and surrounding samples.
Figure 3:
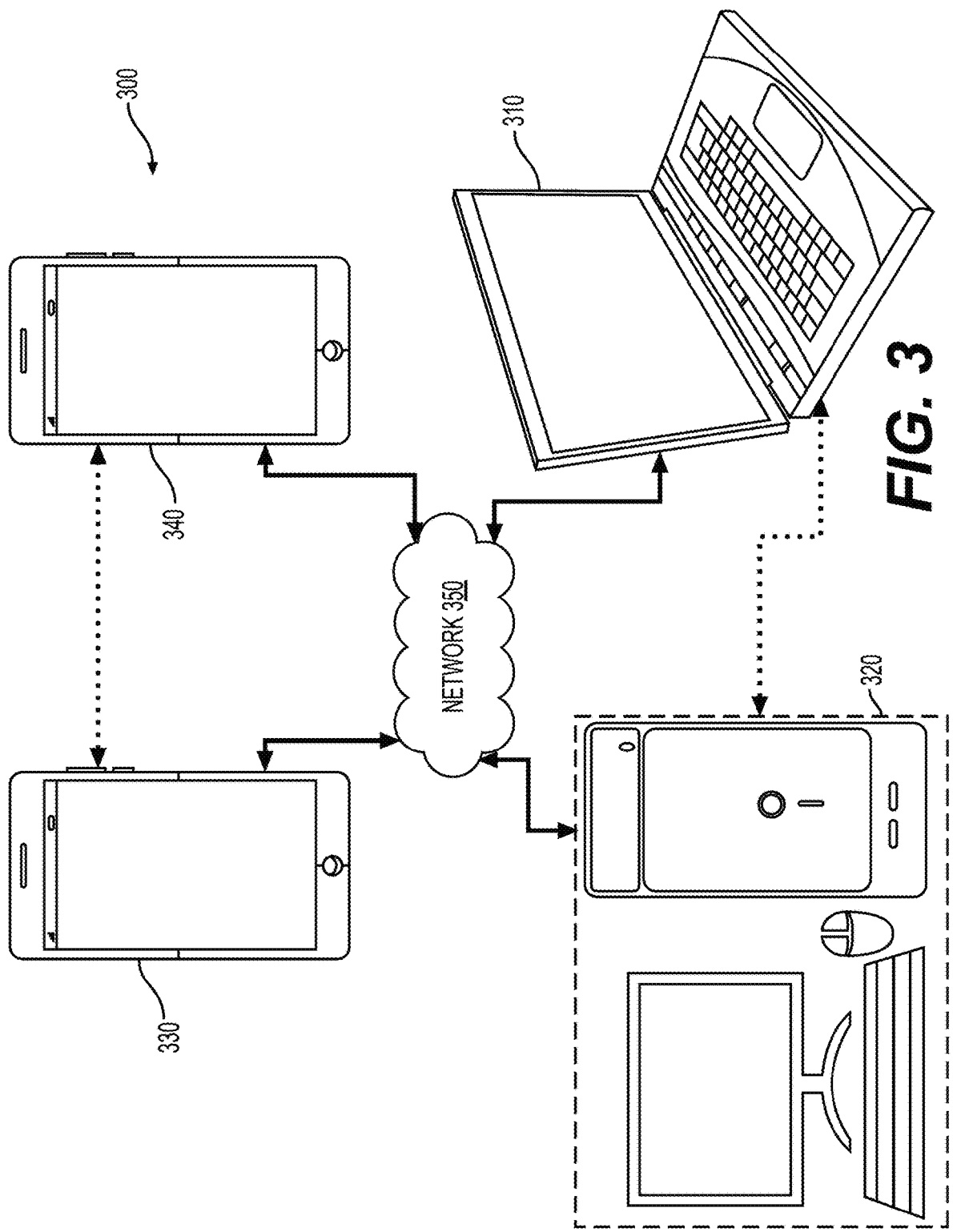
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
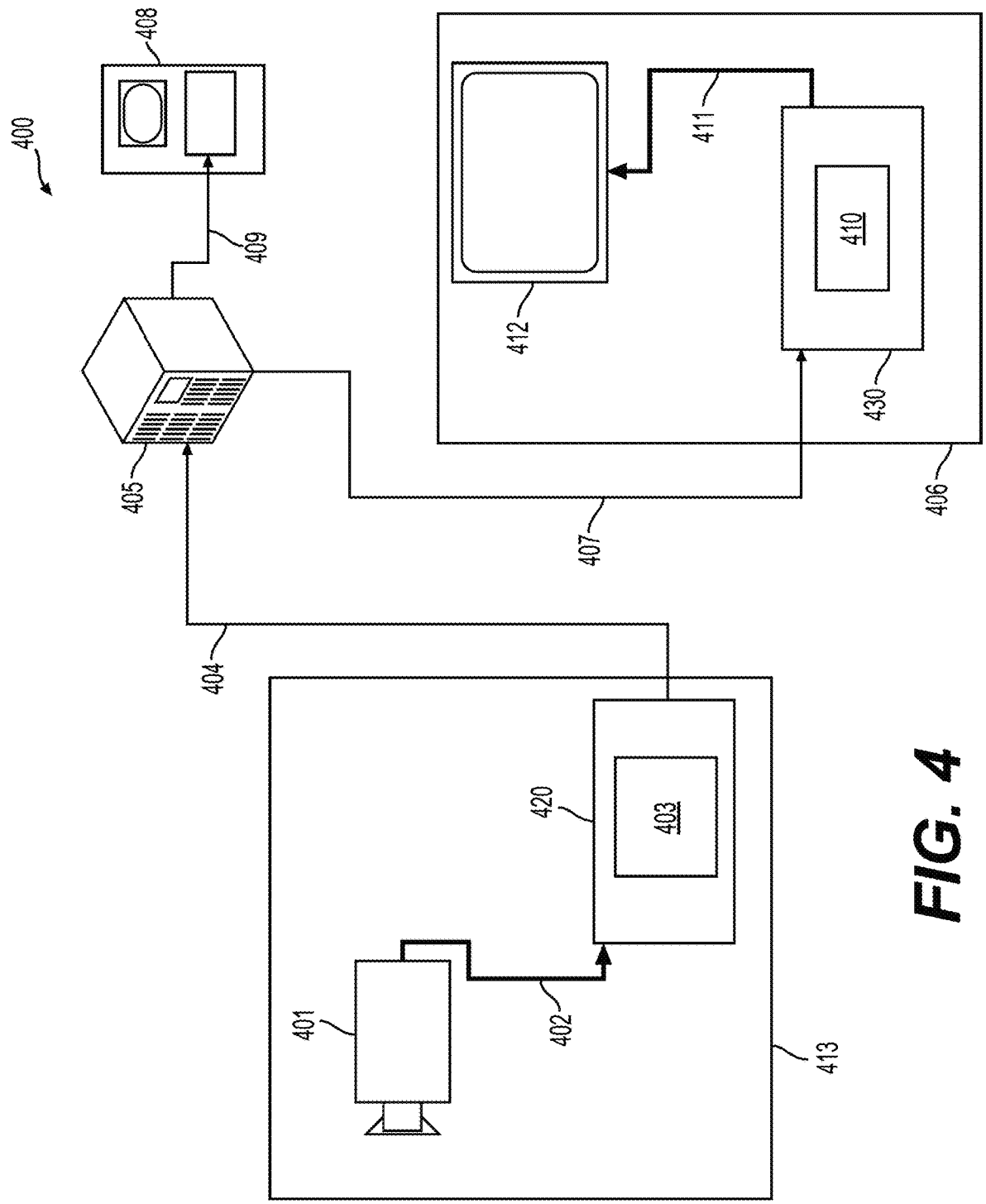
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
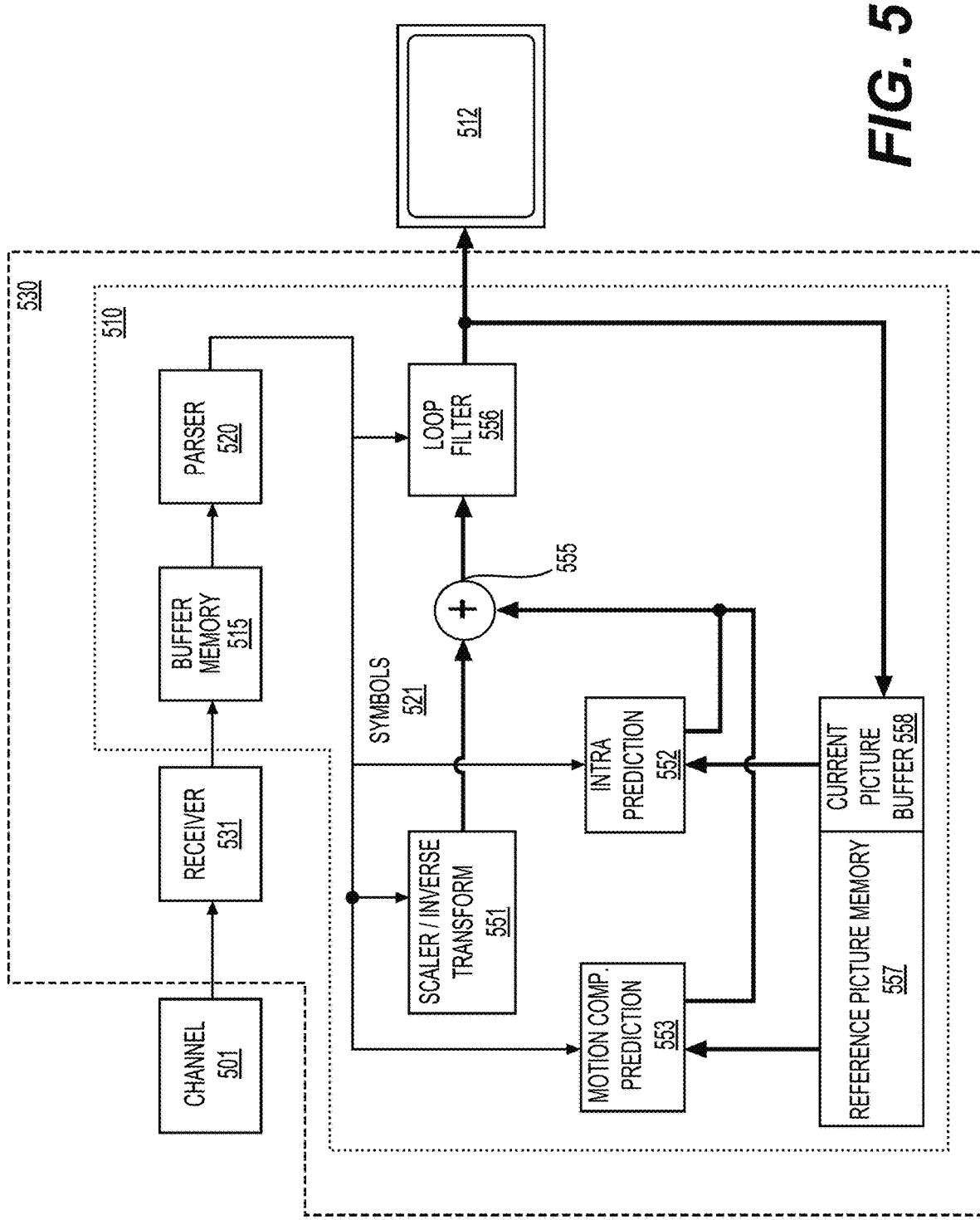
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
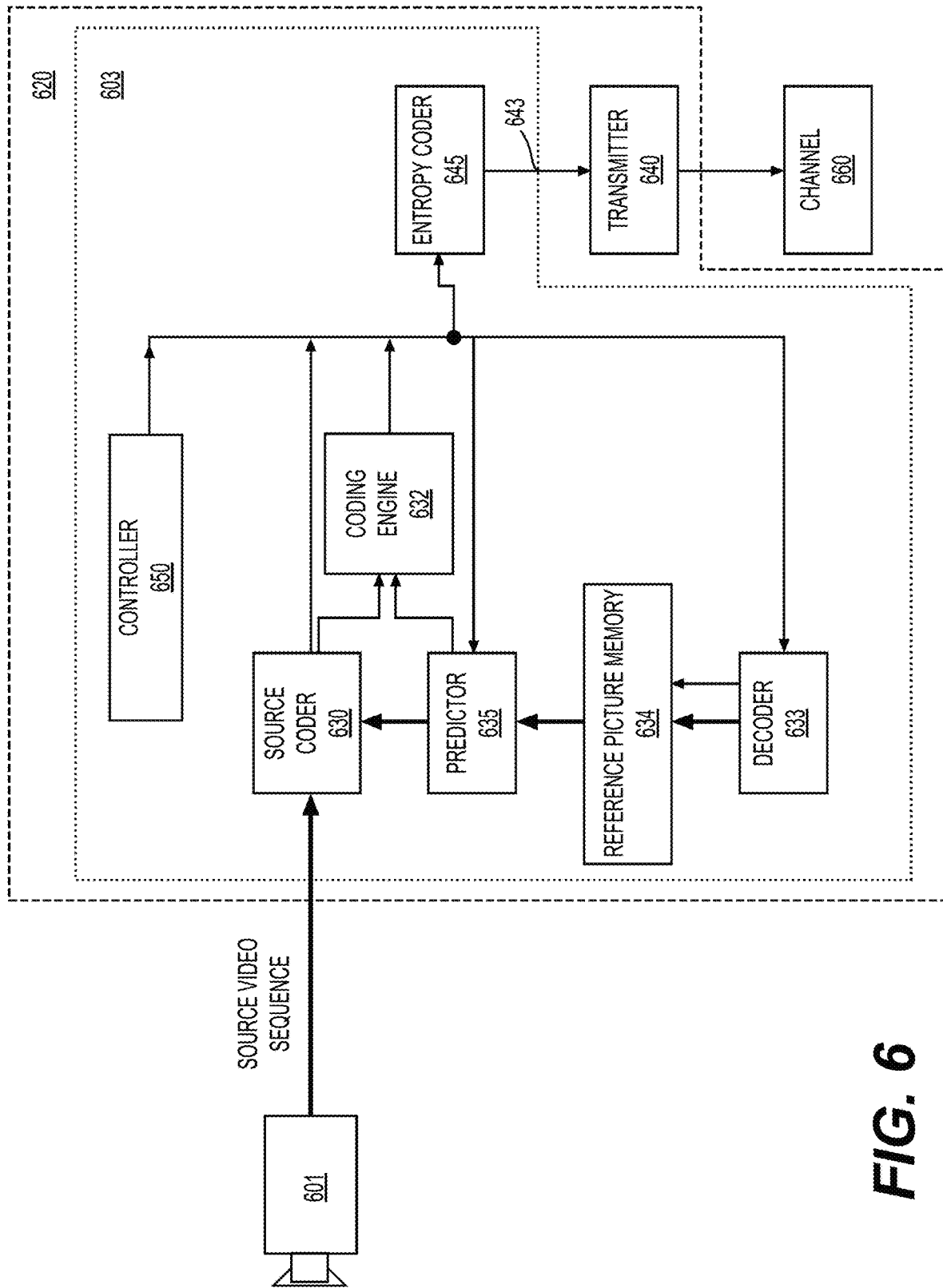
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
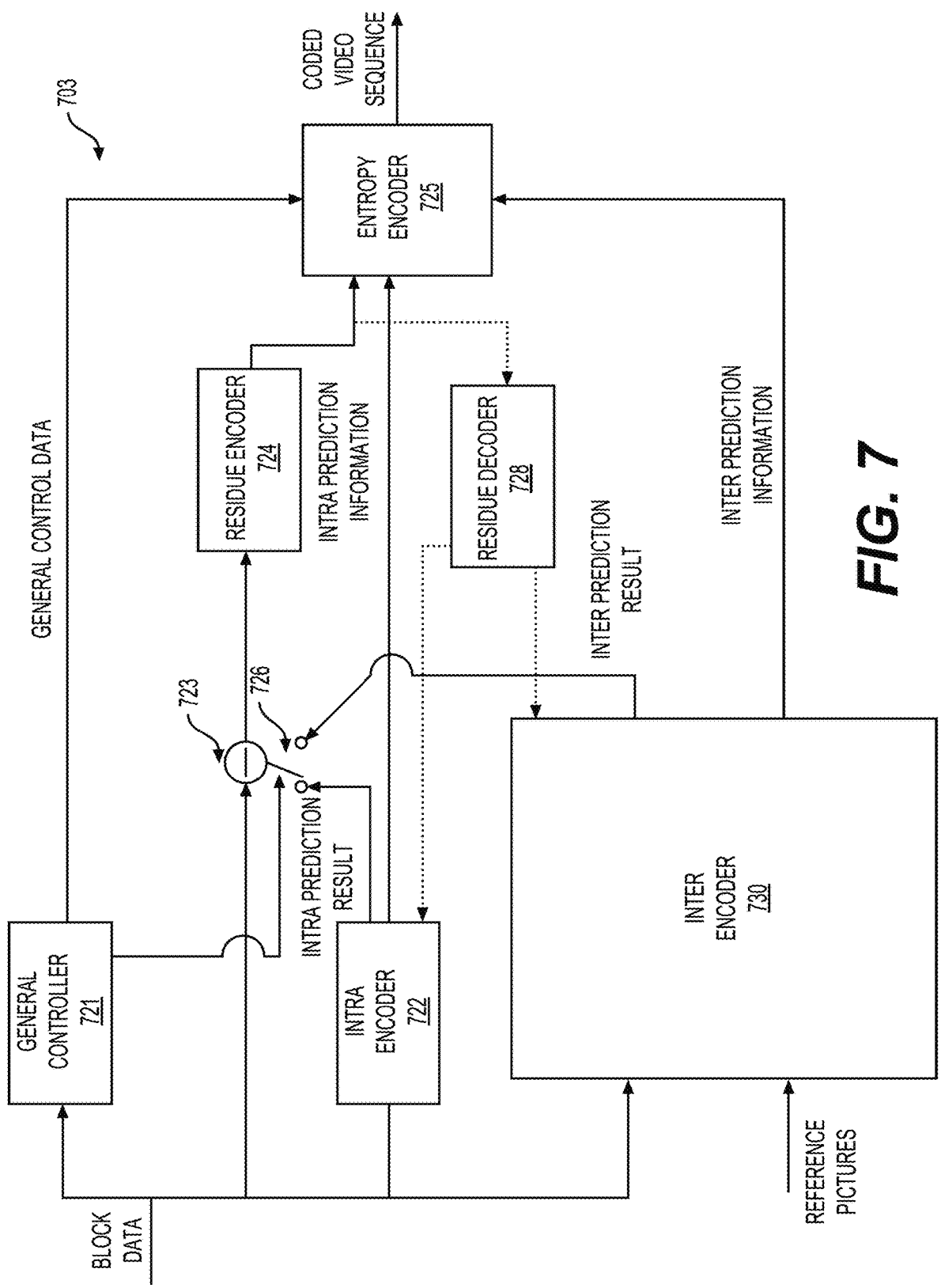
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
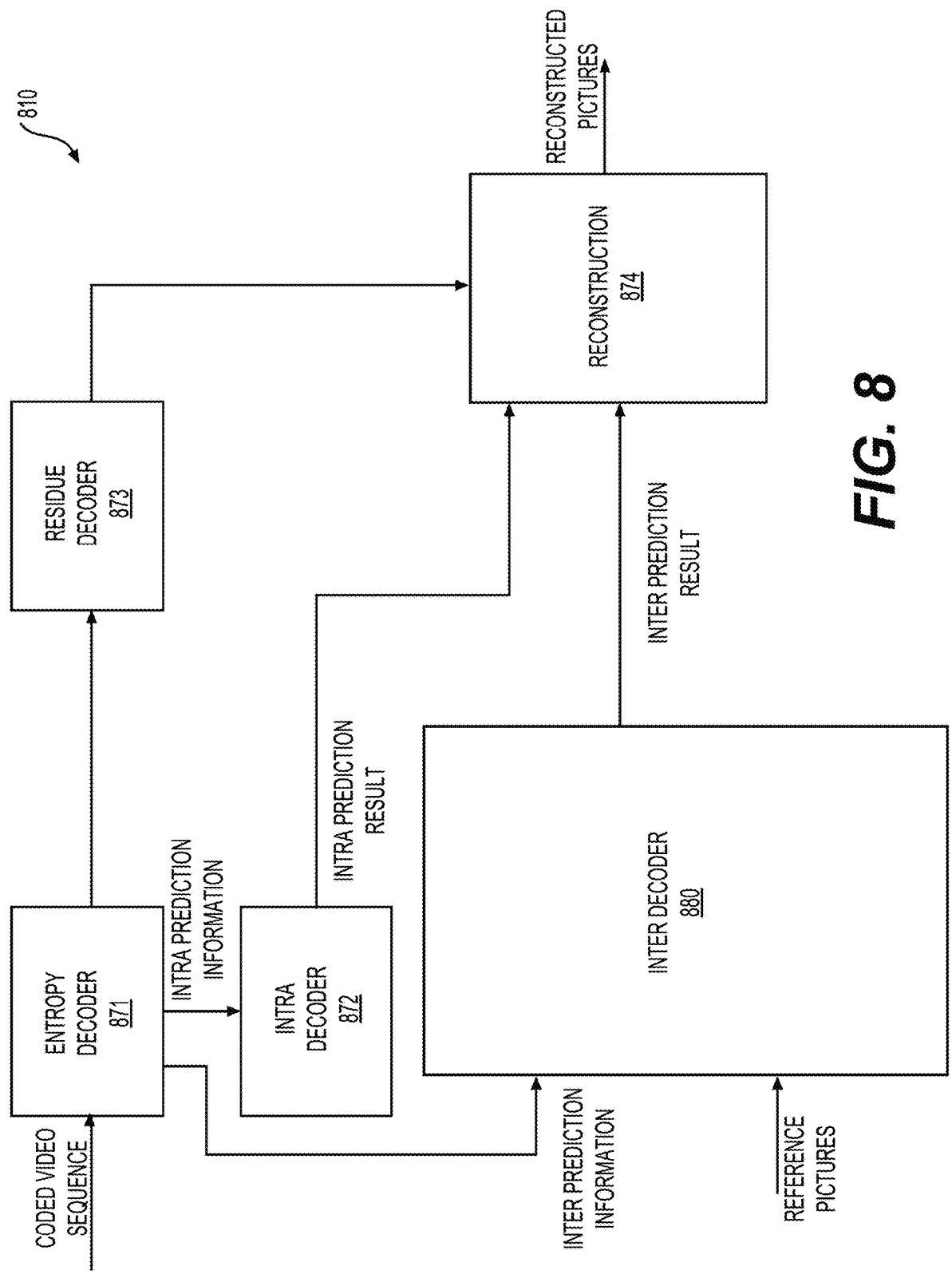
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

In intra prediction or an intra prediction mode, sample values of a coding block can be predicted from neighboring samples that are already reconstructed or reconstructed neighboring samples (referred to as reference samples).

An example of intra prediction is directional intra prediction. In the directional intra prediction, a sample (e.g., a current sample) in a current block can be predicted using a reference sample (e.g., a prediction sample) or an interpolated reference sample. For example, a connected line between the current sample and the prediction sample forms a given angle direction, such as used in an angular mode.

In another example of intra prediction, a planar mode that is based on sample interpolation is used. In the planar mode, one or more key positions in or around the current block can be predicted using neighboring reference samples. Other positions in the current block can be predicted as a linear combination of sample(s) at the one or more key positions and the reference samples. Weights (e.g., combination weights) may be determined according to a location of the current sample in the current block.

An example of the planar mode, such as in VVC, is calculated below.

$$predV[x][y] = \qquad\qquad\qquad\qquad\qquad\qquad\qquad\text{Eq. 1}$$
$$((H-1-y) \times p[x][-1] + (y+1) \times p[-1][H]) << \text{Log2}(W)$$

$$predH[x][y] = \qquad\qquad\qquad\qquad\qquad\qquad\qquad\text{Eq. 2}$$
$$((W-1-x) \times p[-1][y] + (x+1) \times p[W][-1]) << \text{Log2}(H)$$

$$pred[x][y] = \qquad\qquad\qquad\qquad\qquad\qquad\qquad\text{Eq. 3}$$
$$(preV[x][y] + predH[x][y] + W \times H) >> (\text{Log2}(W) + \text{Log2}(H) + 1)$$

Figure 9:
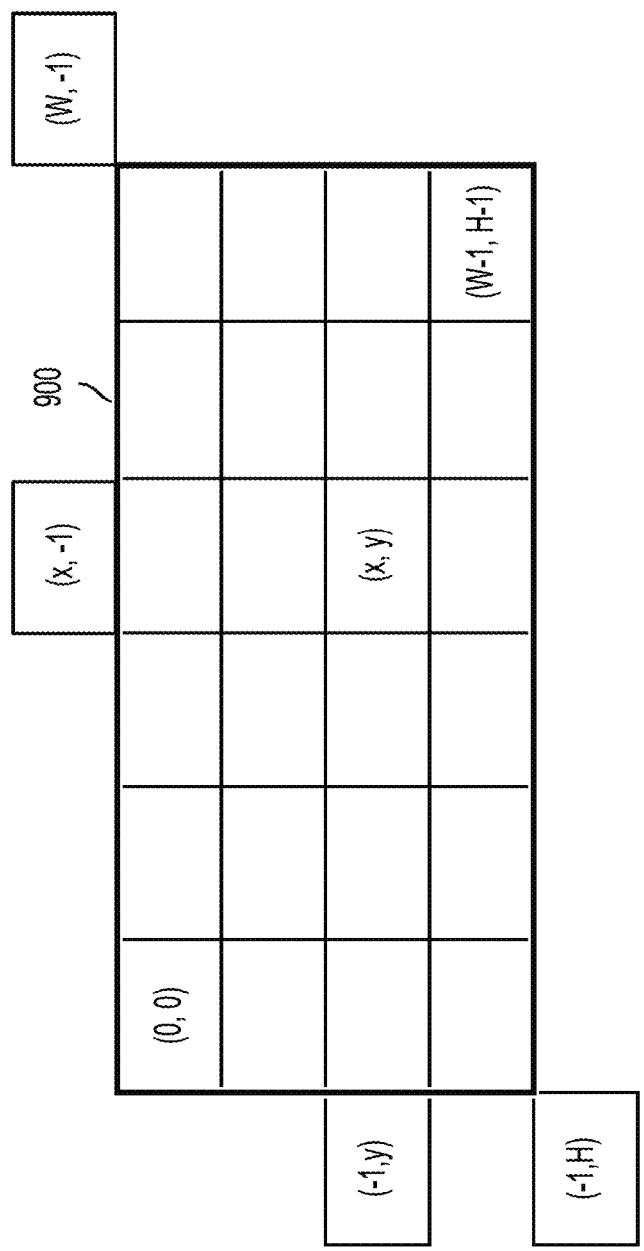
FIG. 9 shows exemplary reference samples of a current block.

Referring to FIG. 9, a current block (900) includes samples at positions (0, 0) to (H−1, W−1) in the current block (900). W and H are a width and a height of the current block (900), respectively. A predicted sample value pred[x][y] of a current sample at a position (x, y) (x=0, 1, . . . , or W−1, and y=0, 1, . . . , or H−1) in the current block (900) can be obtained as a weighted average of reference sample values (e.g., p[−1][y], p[x][−1], p[−1][H], and p[W][−1]) of reference samples located at positions (−1, y), (x, −1), (−1, H), and (W, −1), respectively), as shown in Eqs. 1-3. The reference samples can include the reference sample located at the position (−1, y) in the same row as the current sample, the reference sample at the position (x, −1) in the same column as the current sample, the reference sample at the bottom-left position (−1, H) with respect to the current block, and the reference sample at the top-right position (W, −1) with respect to the current block.

As described above, the reference sample values of the reference samples can include p[−1][y] of the reference sample located at the position (−1, y), p[x][−1] of the reference sample located at the position (x, −1), p[−1][H] of the reference sample located at the bottom-left position (−1, H), and p[W][−1] of the reference sample located at the top-right position (W, −1). In an example shown in Eq. 1, a vertical predictor predV[x][y] is determined based on the reference samples located at the positions (x, −1) and (−1, H). In an example shown in Eq. 2, a horizontal predictor predH[x][y] is determined based on the reference samples located at the positions (−1, y) and (W, −1). In Eq. 3, the predicted sample value pred[x][y] is determined based on an average (e.g., a weighted average) of the horizontal predictor predH[x][y] and the vertical predictor predV[x][y].

A cross-component linear model prediction (CCLM) mode is a cross-component prediction method. In the CCLM, chroma samples can be predicted based on reconstructed luma samples using a linear model. The linear model can be built by neighboring already reconstructed samples of a current block (e.g., a chroma block to be coded). In some embodiments, the prediction performance is high when the luma and chroma channels are highly linearly correlated.

In an embodiment, a chroma block (e.g., a current Cb block or a current Cr block) is predicted based on a collocated luma block. A prediction block Pred_C of the chroma block can be derived as follows where a sample Pred_C(x, y) in the prediction block Pred_C of the chroma block can be determined based on sample(s) in the collocated luma block that is already reconstructed.

$$\text{Pred\_C}(x, y) = a \times \text{Rec\_L'}(x, y) + b \qquad \text{Eq. 4}$$

Pred_C(x, y) represents a predicted chroma sample at a sample location (x, y) of the chroma block (e.g., in a chroma channel of a current picture or a chroma picture). Rec_L'(x, y) can be determined from reconstructed sample(s) in the collocated luma block (e.g., in a luma channel of the current picture or a luma picture) that is already reconstructed. Rec_L' (x, y) can represent a reconstructed luma sample in the collocated luma block or a downsampled luma sample of the collocated luma block.

In an example, Rec_L' is the collocated luma block that is already reconstructed, for example, when a color format is 4:4:4 and a size of the chroma block is identical to a size of the collocated luma block. Thus, Rec_L'(x, y) can represent a reconstructed sample in the collocated luma block where the reconstructed sample corresponds to the sample location (x, y) of the chroma block.

In an example, Rec_L' is different from the collocated luma block that is already reconstructed. The current chroma block is collocated with the collocated luma block, and the luma channel and the chroma channel have different resolutions. In an example, when a color format is 4:2:0, the resolution of the luma block is two times that of the chroma block both vertically and horizontally. Therefore, when the color format is 4:2:0, Rec_L' can be a down-sampled block of the corresponding luma block to match the chroma block size during the derivation of linear model. In some embodiments, the collocated luma block is down-sampled when the color format is not 4:4:4.

Parameters (e.g., model parameters) a and b in Eq. 4 can represent a slope and an offset in the linear model shown in Eq. 4, and can be referred to as a slope parameter and an offset parameter, respectively. The parameters a and b in Eq. 4 can be derived from reconstructed neighboring samples (e.g., chroma samples and luma samples) around (i) the current chroma block in the chroma channel and (ii) the collocated luma block in the luma channel. The parameters a and b can be determined using any suitable method.

In an example, the parameters a and b are determined with the classical linear regression theory. A minimum linear least square solution between (i) reconstructed neighboring luma samples or down-sampled samples of the reconstructed neighboring luma samples and (ii) reconstructed neighboring chroma samples can be applied to derive the parameters a and b below.

$$a = \frac{N * \sum_{i=1}^{N} (\text{Rec\_C}(i) * \text{Rec\_L}\prime(i)) - \sum_{i=1}^{N} \text{Rec\_C}(i) * \sum_{i=1}^{N} \text{Rec\_L}\prime(i)}{N * \sum_{i=1}^{N} (\text{Rec\_L}\prime(i) * \text{Rec\_L}\prime(i)) - \sum_{i=1}^{N} \text{Rec\_L}\prime(i) * \sum_{i=1}^{N} \text{Rec\_L}\prime(i)} \qquad \text{Eq. 5}$$

$$b = \frac{\sum_{i=1}^{N} (\text{Rec\_C}(i) - a * \sum_{i=1}^{N} \text{Rec\_L}\prime(i)}{N} \qquad \text{Eq. 6}$$

In Eqs. 5-6, N reconstructed neighboring chroma samples Rec_C(i) and N corresponding luma samples Rec_L'(i) are used. In an example, such as when the color format is 4:4:4, the N corresponding luma samples Rec_L'(i) includes N reconstructed neighboring luma samples of the luma block. In an example, such as when the color format is 4:2:0, the N corresponding luma samples Rec_L'(i) includes N down-sampled samples of the reconstructed neighboring luma samples of the luma block. i can be an integer from 1 to N.

The N reconstructed neighboring chroma samples used to determine the parameters a and b can include any suitable already reconstructed neighboring samples of the chroma block. The reconstructed neighboring luma samples used to determine the parameters a and b can include any suitable already reconstructed neighboring samples of the collocated luma block.

The prediction process of the CCLM mode can include: (1) down-sampling the collocated luma block and the reconstructed neighboring luma samples of the collocated luma block to obtain Rec_L' and the down-sampled neighboring luma samples and thus match a size of the corresponding chroma block, (2) deriving the parameters a and b based on the down-sampled neighboring luma samples and the reconstructed neighboring chroma samples, for example, using Eqs. 5-6, and (3) applying the CCLM model (e.g., Eq. 4) to generate the chroma prediction block Pred_C. In some examples, step (1) is omitted when the spatial resolutions of the collocated luma block and the chroma block are identical and step (2) is based on the reconstructed neighboring luma samples.

Figure 10:
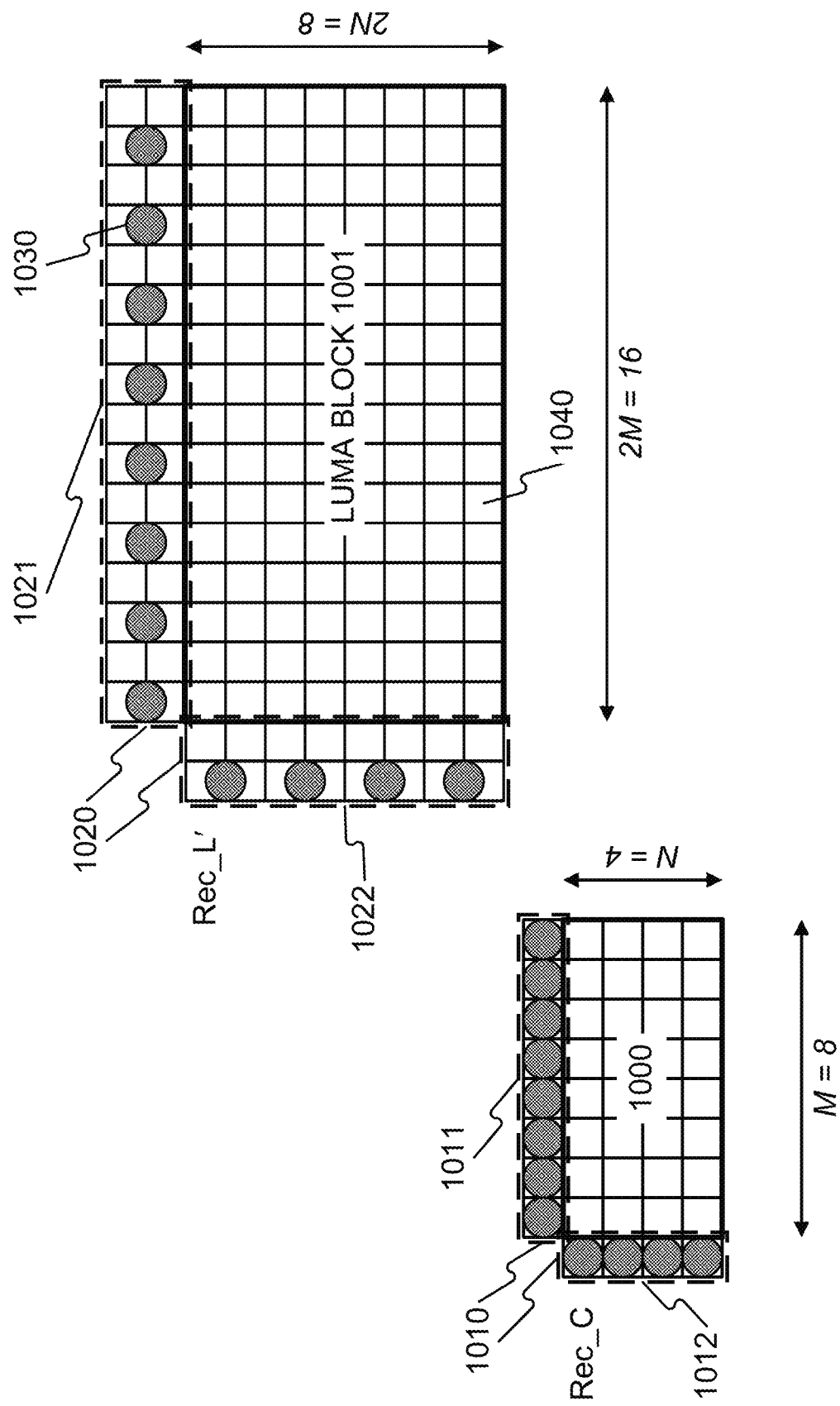
FIG. 10 shows examples of reconstructed neighboring luma samples and reconstructed neighboring chroma samples used in a cross-component linear model (CCLM) mode.

FIG. 10 shows examples of reconstructed neighboring luma samples and reconstructed neighboring chroma samples used in the CCLM derivation. A chroma block (1000) is under reconstruction. A width and a height of the chroma block (1000) are M (e.g., 8) and N (e.g., 4), respectively. N and M can be positive integers. A luma block (e.g., a collocated luma block) (1001) that is collocated with the chroma block (1000) is used to predict the chroma block (1000). The luma block (1001) includes luma samples (1040). The luma block (1001) can have any suitable width and any suitable height. In the example shown in FIG. 10, the width and the height of the luma block (1001) are 2 M (e.g., 16) and 2N (e.g., 8), respectively.

Neighboring chroma samples (1010) (e.g., shaded in gray) of the chroma block (1000) are already reconstructed. Neighboring luma samples (1020) of the luma block (1001)

are already reconstructed. The neighboring chroma samples (1010) can include top neighboring chroma samples (1011) and left neighboring chroma samples (1012). The neighboring luma samples (1020) of the luma block (1001) can include top neighboring luma samples (1021) and left neighboring luma samples (1022).

In the example of FIG. 10, the neighboring luma samples (1020) are sub-sampled or down-sampled to generate down-sampled neighboring luma samples (1030) (e.g., shaded in gray) to match a number (e.g., 12) of the neighboring chroma samples. In the example shown in FIG. 10, the neighboring chroma samples (1010) and the down-sampled neighboring luma samples (1030) can be used to determine parameters a and b, such as shown in Eqs. 5-6.

In an example, the neighboring chroma samples of the chroma block (1000) only include the top neighboring chroma samples (1011) and does not include the left neighboring chroma samples (1012). Accordingly, the neighboring luma samples of the luma block (1001) only include the top neighboring luma samples (1021) and does not include the left neighboring luma samples (1022). As described above, the top neighboring luma samples (1021) can be down-sampled (e.g., the down-sampled luma samples are shaded in gray) to match a number (e.g., 8) of the top neighboring chroma samples (1011).

In an example, the neighboring chroma samples of the chroma block (1000) only include the left neighboring chroma samples (1012) and does not include the top neighboring chroma samples (1011). Accordingly, the neighboring luma samples of the luma block (1001) only include the left neighboring luma samples (1022) and does not include the top neighboring luma samples (1021). As described above, the left neighboring luma samples (1022) can be down-sampled (e.g., the down-sampled luma samples are shaded in gray) to match a number (e.g., 4) of the left neighboring chroma samples (1012).

In some examples, chroma samples in neighboring reconstructed blocks of the chroma block (1000) and corresponding luma samples in neighboring reconstructed blocks of the luma block (1001) can be used to determine the parameters a and b.

The chroma block (1000) can be a Cb block in a Cb channel or a Cr block in a Cr channel. In an example, for each chroma channel (e.g., Cr or Cb), the parameters a and b can be determined separately. For example, the parameters a and b of the Cr block are determined based on chroma reconstructed neighboring samples of the Cr block, and the parameters a and b of the Cb block are determined based on chroma reconstructed neighboring samples of the Cb block.

Figure 11:
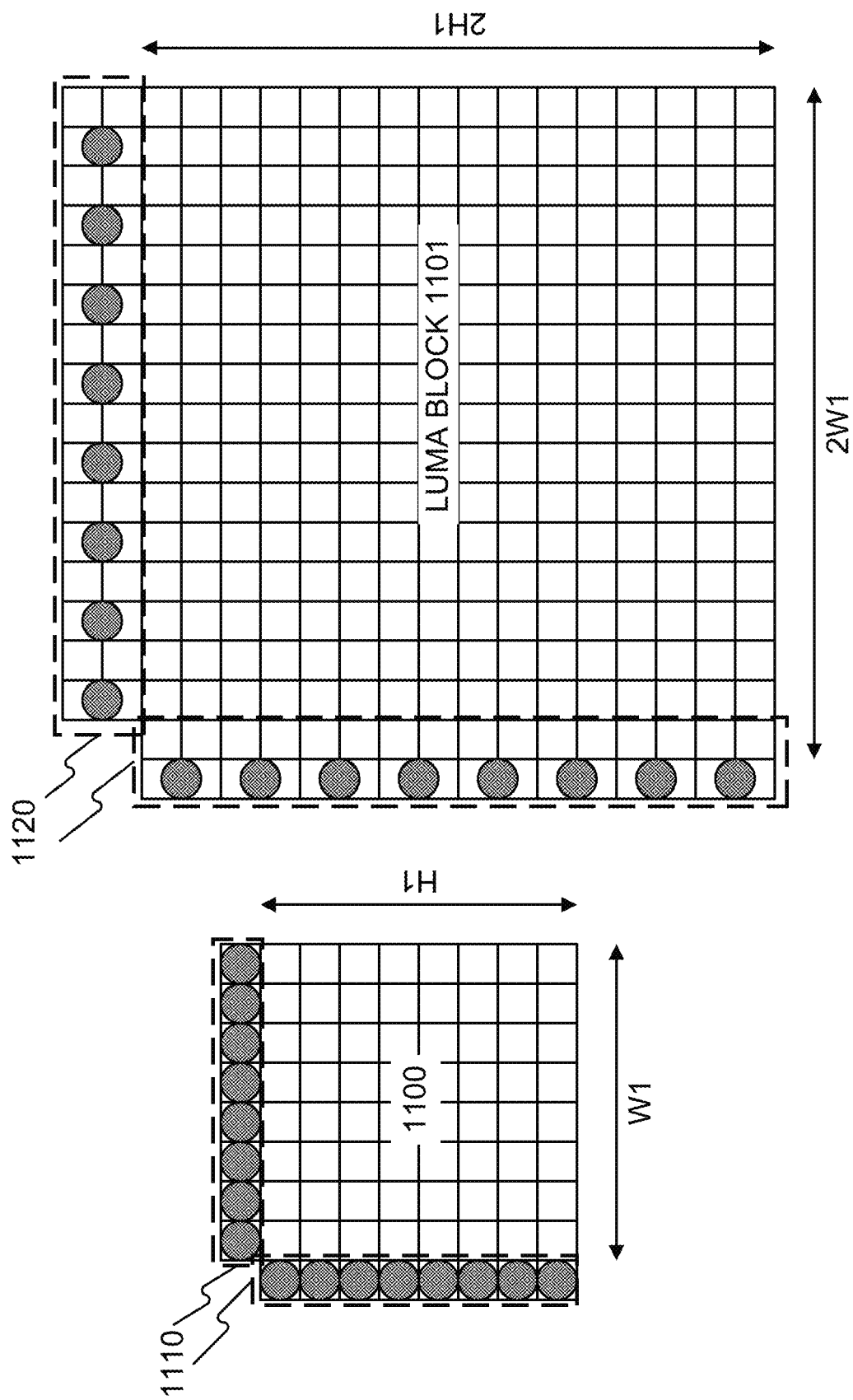
FIG. 11 shows examples of reconstructed neighboring luma samples and reconstructed neighboring chroma samples used in the CCLM mode.

FIG. 10 shows examples of the reconstructed neighboring luma samples and the reconstructed neighboring chroma samples used in the CCLM derivation for the chroma block (1000) that has a rectangular shape. The examples in FIG. 10 can be adapted to a chroma block and a collocated luma block that have any shape, such as a square shape. FIG. 11 shows examples of reconstructed neighboring luma samples (1120) and reconstructed neighboring chroma samples (1110) used in the CCLM derivation for a chroma block (1100). A width and a height of the chroma block (1100) are W1 (e.g., 8) and H1 (e.g., 8), respectively where W1 is equal to H1. A luma block (e.g., a collocated luma block) (1101) that is collocated with the chroma block (1100) is used to predict the chroma block (1100). A width and a height of the luma block (1101) are 2W1 (e.g., 16) and 2H1 (e.g., 16), respectively.

In some embodiments, the reference samples used to generate the linear model parameters a and b are noisy and/or less representative of a content inside an actual prediction block. Thus, the prediction may be suboptimal with respect to coding efficiency. Accordingly, it may be beneficial to develop more content adaptive linear models for chroma sample prediction, for example.

The disclosure describes an adaptive parameter selection for cross-component prediction in image and video compression. In an embodiment, the slope parameter and/or the offset parameter (e.g., the parameters a and/or the parameter b) used in the CCLM prediction are adaptively adjusted, and thus the linear model can be more content adaptive for the chroma sample prediction. For example, the linear model (e.g., the parameters a and/or the parameter b) is more adaptive to a content of the collocated luma block. In an example, a content of the chroma block is related to the content of the collocated luma block, and thus the CCLM prediction can be adaptive to the content of the chroma block.

Adjustments to the slope parameter and/or the offset parameter can modify the linear function (e.g., Eq. 4) which maps luma sample values to chroma sample values such that the chroma sample values can be mapped from the luma sample values according to the property of luma sample values in the collocated luma block.

As described above, in the CCLM, a model with two parameters (e.g., the parameters a and b in Eq. 4) is used to map luma values to chroma values. The slope parameter a and the offset parameter b are used in Eq. 4. An adjustment of the parameters a and b (e.g., the slope parameter and the offset parameter) can be employed to update the linear model in Eq. 4 to an updated linear model in Eq. 7.

$$\text{Pred\_C}(x, y) = a' \times \text{Rec\_L}'(x, y) + b' \qquad \text{Eq. 7}$$

In Eq. 7, an updated slope parameter a' is a function of the slope parameter a, for example, a'=f1(a), an updated offset parameter b' is a function of the offset parameter b, for example, b'=f2(b). The adjustment to the parameters a and b can be based on local sample information, e.g., local luma reconstructed sample information of the collocated luma block.

Figure 12B:
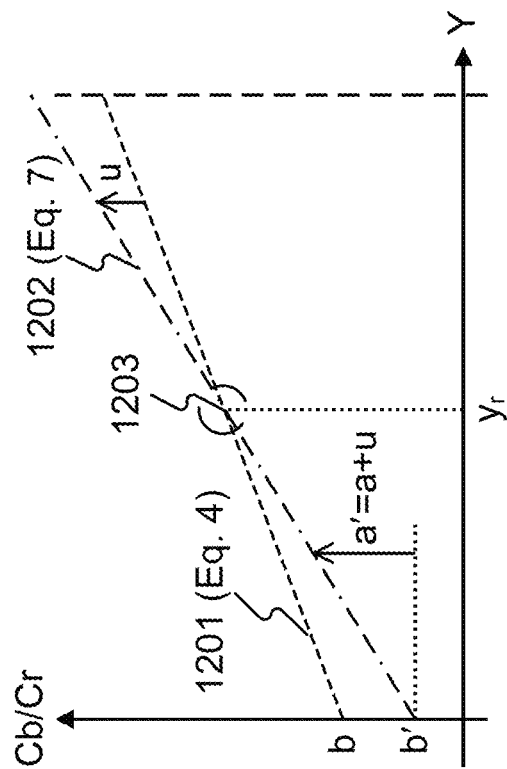
FIGS. 12A-12B show examples of parameter adjustments used in the CCLM mode.
Figure 12A:
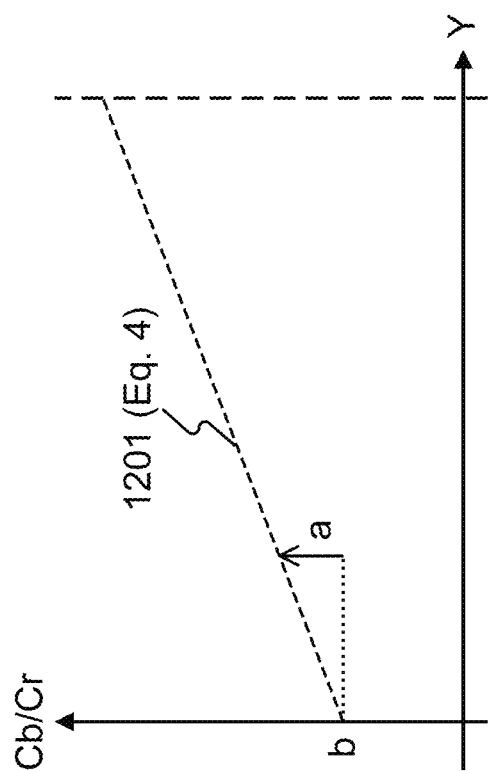

FIGS. 12A-12B show examples of parameter adjustments used in the CCLM. FIG. 12A shows the CCLM with Eq. 4. A predicted chroma sample value (e.g., Cb for a Cb block or Cr for a Cr block) has a linear relationship (1201) corresponding to Eq. 4 with a corresponding luma value (e.g., Y), where the slope of the linear relationship (1201) is the slope parameter a and the offset of the linear relationship (1201) is the offset parameter b. FIG. 12B shows two linear relationships (1201)-(1202) corresponding to Eqs. 4 and 7, respectively. In the linear relationship (1202) corresponding to Eq. 7, a predicted chroma sample value (e.g., Cb for a Cb block or Cr for a Cr block) has the linear relationship (1202) with a corresponding luma value (e.g., Y) where the slope is the updated slope parameter a' and the offset is the updated offset parameter b'.

In the example shown in FIG. 12B, the updated slope parameter a' is a linear function of the slope parameter a where a' is (a+u). An adjustment parameter u used to adjust the slope parameter a can be referred to as the slope adjustment parameter "u". The updated offset parameter b' can be a linear function of the offset parameter b. In an example, b'=b−u×$y_r$. An adjustment parameter $y_r$ used to adjust the offset parameter b can be referred to as the offset adjustment parameter "$y_r$". Referring to FIG. 12B, with the adjustments (e.g., a'=a+u and b'=b−u×y$_r$), the linear relationship (1201) (e.g., the mapping function used in Eq. 4) is tilted or rotated around a point (1203) to generate the linear relationship (1202). In an example, the adjustment parameter y$_r$ represents a luminance value (e.g., Y being y$_r$) at the point (1203) where the linear relationships (1201)-(1202) intercept.

In an example, the slope parameter and the offset parameter are adjusted. In an example, one of the slope parameter and the offset parameter is adjusted. In some examples, the adjustment parameters u and y$_r$ are determined or derived. In some examples, one of the adjustment parameters u and y$_r$ is determined.

In the adjustment formula of a' (e.g., a'=a+u) and b' (e.g., b'=b−u×y$_r$), the adjustment parameter u can be signaled or derived. A value of the adjustment parameter u can be either positive or negative. The adjustment parameter y$_r$ used to adjust the offset parameter b such as in b'=b−u×y$_r$ can be determined based on the collocated luma block. For example, the adjustment parameter y$_r$ is determined based on selected value(s) of respective reference luma sample(s) in the collocated luma block.

In the CCLM, Eq. 7 can be used to predict a chroma block (e.g., the chroma block (1000)) based on a collocated luma block (e.g., the luma block (1001)). As described above, the updated offset parameter b' can be a linear function of the offset parameter b, such as b' being (b−u×y$_r$). According to an embodiment of the disclosure, the adjustment parameter y$_r$ used to adjust the offset parameter b can be determined based on a subset of luma samples in the collocated luma block (e.g., the luma block (1001)). In an embodiment, the subset of luma samples in the collocated luma block (e.g., the luma block (1001)) does not include one or more samples in the collocated luma block.

Figure 13:
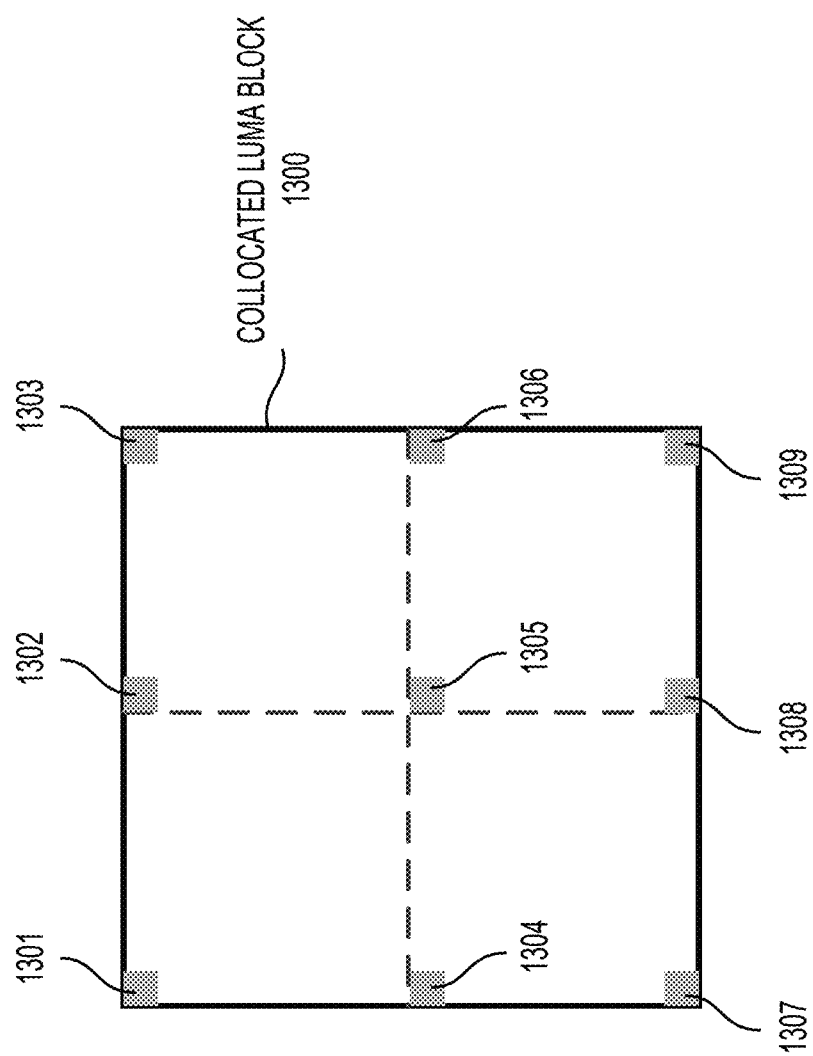
FIG. 13 shows examples of sample positions of selected luma samples in a collocated luma block used to determine an adjustment parameter.

FIG. 13 shows examples of sample positions of selected luma samples in a collocated luma block (1300) that can be used to determine the adjustment parameter y$_r$. The collocated luma block (1300) is collocated with a chroma block to be coded (e.g., to be reconstructed). The collocated luma block (1300) includes luma samples (e.g., reference luma samples) that are already reconstructed. The collocated luma block (1300) or a down-sampled luma block that is down-sampled from the collocated luma block (1300) can be used as Rec_L' in Eq. 7 to predict the chroma block. Further, one or more of the selected luma samples in the collocated luma block (1300) can be used to determine the adjustment parameter y$_r$.

The luma samples in the collocated luma block (1300) can include luma samples (e.g., the selected luma samples) (1301)-(1309). The luma samples (1301)-(1309) are located at a top-left corner, an above center, a top-right corner, a left-most center, a center, a right-most center, a bottom-left corner, a bottom center, and a bottom-right corner of the collocated luma block (1300), respectively.

The adjustment parameter y$_r$ can be selected as a sample value of one of the luma samples (1301)-(1309). The adjustment parameter y$_r$ can be selected as an average (e.g., a weighted average) of sample values of a plurality of samples in the luma samples (1301)-(1309).

In an embodiment, the adjustment parameter y$_r$ is selected as a sample value of the luma sample (1309) at the bottom-right corner of the collocated luma block (1300).

In an embodiment, the adjustment parameter y$_r$ is selected as a sample value of the luma sample (1305) at the center of the collocated luma block (1300).

In an embodiment, the adjustment parameter y$_r$ is selected as a sample value of the luma sample (1306) at the right-most center of the collocated luma block (1300).

In an embodiment, the adjustment parameter y$_r$ is selected as a sample value of the luma sample (1308) at the bottom center of the collocated luma block (1300).

In an embodiment, the adjustment parameter y$_r$ is selected as a sample value from a position such as the top-left corner (e.g., corresponding to the luma sample (1301)), the top-right corner (e.g., corresponding to the luma sample (1303)), or the bottom-left corner (e.g., corresponding to the luma sample (1307)) of the collocated luma block (1300).

In an embodiment, the adjustment parameter y$_r$ is determined as an average (e.g., a weighted average) of samples values of certain luma samples, such as the luma samples (1301), (1303), (1307), and (1309) located at the four corners (e.g., the top-left corner, the top-right corner, the bottom-left corner, and the bottom-right corner) of the collocated luma block (1300).

In an embodiment, the adjustment parameter y$_r$ is determined as an average (e.g., a weighted average) of sample values of a plurality of samples in the luma samples (1301)-(1309) in the collocated luma block (1300).

The luma samples (1301)-(1309) are examples of luma samples in the collocated luma block (1300) that can be used to determine the adjustment parameter y$_r$. Another luma sample or other luma samples in the collocated luma block (1300) that are not in the luma samples (1301)-(1309) can be used to determine the adjustment parameter y$_r$.

Selection of luma sample(s) in a collocated luma block to adjust the parameters a and b used in the CCLM model can be made more adaptive for different chroma blocks or different regions (e.g., subblocks) inside a chroma block where the collocated luma block is collocated with the chroma block.

In an embodiment, different adjustment parameters y$_r$ are used for different chroma blocks. For example, luma samples located at different locations in respective luma blocks can be used as the adjustment parameters y$_r$ of the different chroma blocks. For a chroma block, such as the chroma block collocated with the collocated luma block (1300) in FIG. 13, one of the available options, such as one of the luma samples (1301)-(1309), can be used for the chroma block. In an example, one of (i) the luma sample (1305) at the center position of the collocated luma block (1300) and (ii) the luma sample (1309) at the bottom-right corner position of the collocated luma block (1300) can be chosen to determine the adjustment parameters y$_r$ used to adjust the offset parameter b. For the chroma block, a selection indicator, for example, indicating which sample(s) are used to determine the adjustment parameters y$_r$ can be signaled or derived. The selection indicator can be a selection index or a selection flag.

Different chroma blocks can have different methods to obtain adjustment parameters y$_r$. In an example, a selection index for a first chroma block indicates that an adjustment parameter y$_r$ of the first chroma block is determined based on a luma sample at a center position of a first luma block that is collocated with the first chroma block. Thus, the adjustment parameter y$_r$ of the first chroma block is determined based on the luma sample at the center position of the first luma block. A selection index for a second chroma block indicates that an adjustment parameter y$_r$ of the second chroma block is determined based on a luma sample at a right-most center position of a second luma block that is collocated with the second chroma block. Thus, the adjustment parameter $y_r$ of the second chroma block is determined based on the luma sample at the right-most center position of the second luma block.

Figure 14:
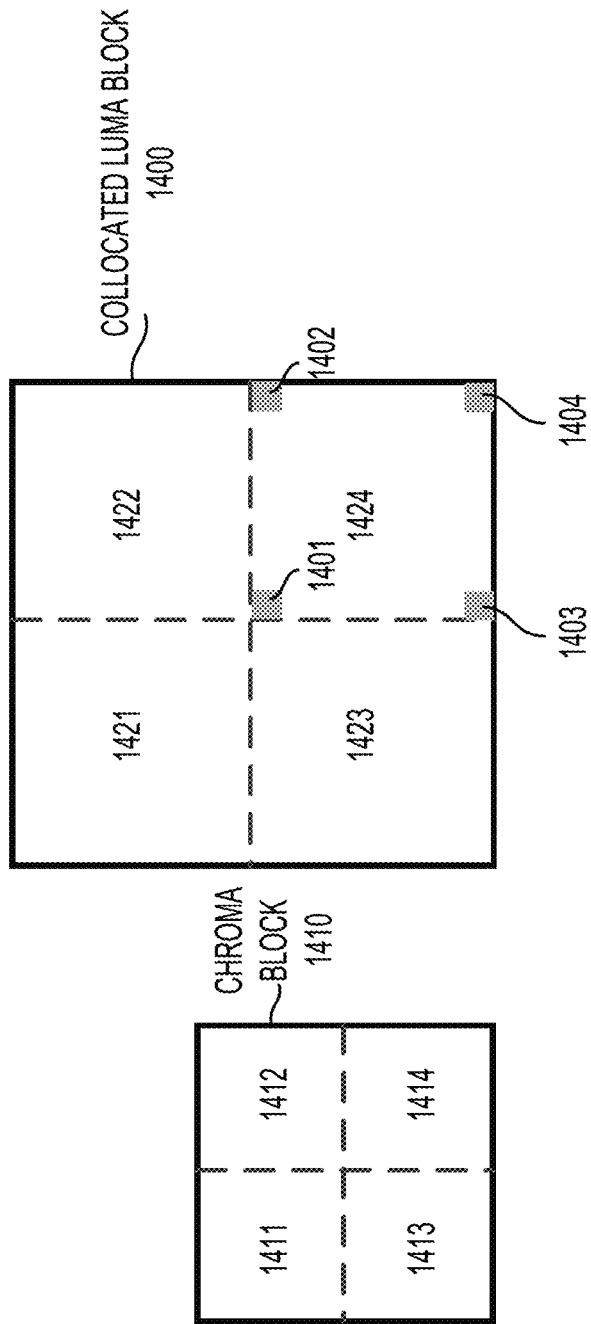
FIG. 14 shows an exemplary chroma block and a collocated luma block.

In an embodiment, adjustment parameters $y_r$ of different regions in a chroma block can be determined using different sample values in a collocated luma block. FIG. 14 shows an example of a chroma block (1410) and a collocated luma block (1400) that is collocated with the chroma block (1410). The chroma block (1410) can be predicted based on the collocated luma block (1400), for example, when a spatial resolution of the chroma block (1410) is identical to a spatial resolution of the collocated luma block (1400) (e.g., a color format is 4:4:4). The chroma block (1410) can be predicted based on a down-sampled luma block that is down-sampled from the collocated luma block (1400), for example, when the spatial resolution of the chroma block (1410) is different from the spatial resolution of the collocated luma block (1400).

The chroma block (1410) includes multiple regions (also referred to as multiple chroma regions), such as a top-left quarter region (1411), a top-right quarter region (1412), a bottom-left quarter region (1413), and a bottom-right quarter region (1414). An adjustment parameter $y_r$ of each of the multiple regions in the chroma block (1410) can be determined based on a respective sample in the collocated luma block (1400).

For example, a center position (1401) of the collocated luma block (1400) is used to determine an adjustment parameter $y_r$ of the top-left quarter region (1411) of the chroma block (1410); a right-most center position (1402) of the collocated luma block (1400) is used to determine an adjustment parameter $y_r$ of the top-right quarter region (1412) of the chroma block (1410); a bottom center position (1403) of the collocated luma block (1400) is used to determine an adjustment parameter $y_r$ of the bottom-left quarter region (1413) of the chroma block (1410); a bottom-right corner position (1404) of the collocated luma block (1400) is used to determine an adjustment parameter $y_r$ of the bottom-right quarter region (1414) of the chroma block (1410).

In an embodiment, an adjustment parameter $y_r$ of one of the multiple regions in the chroma block (1410) is determined based on a corresponding region in the collocated luma block (1400). For example, the corresponding region in the collocated luma block (1400) is collocated with the one of the multiple regions in the chroma block (1410).

Referring to FIG. 14, the collocated luma block (1400) includes multiple regions (also referred to as multiple luma regions) that are collocated with the multiple chroma regions in the chroma block (1410). For example, the multiple luma regions in the collocated luma block (1400) includes a top-left quarter region (1421), a top-right quarter region (1422), a bottom-left quarter region (1423), and a bottom-right quarter region (1424) that are collocated with the top-left quarter region (1411), the top-right quarter region (1412), the bottom-left quarter region (1413), and the bottom-right quarter region (1414) in the chroma block, respectively.

In an example, an average of luma sample values of the top-left quarter region (1421) of the collocated luma block (1400) is used to determine the adjustment parameter $y_r$ of the top-left quarter region (1411) in the chroma block (1410); an average of luma sample values of the top-right quarter region (1422) of the collocated luma block (1400) is used to determine the adjustment parameter $y_r$ of the top-right quarter region (1412) in the chroma block (1410); an average of luma sample values of the bottom-left quarter region (1423) of the collocated luma block (1400) is used to determine the adjustment parameter $y_r$ of the bottom-left quarter region (1413) in the chroma block (1410); and an average of luma sample values of the bottom-right quarter region (1424) of the collocated luma block (1400) is used to determine the adjustment parameter $y_r$ of the bottom-right quarter region (1414) in the chroma block (1410).

In an example, a chroma region (e.g., (1411)) is further divided into multiple chroma sub-regions and a collocated luma region (e.g., (1421)) is further divided into multiple luma sub-regions. An adjustment parameter $y_r$ of each chroma sub-region in the region (1411) can be determined based on an average of luma sample values of the respective luma sub-region in the region (1421).

Figure 15:
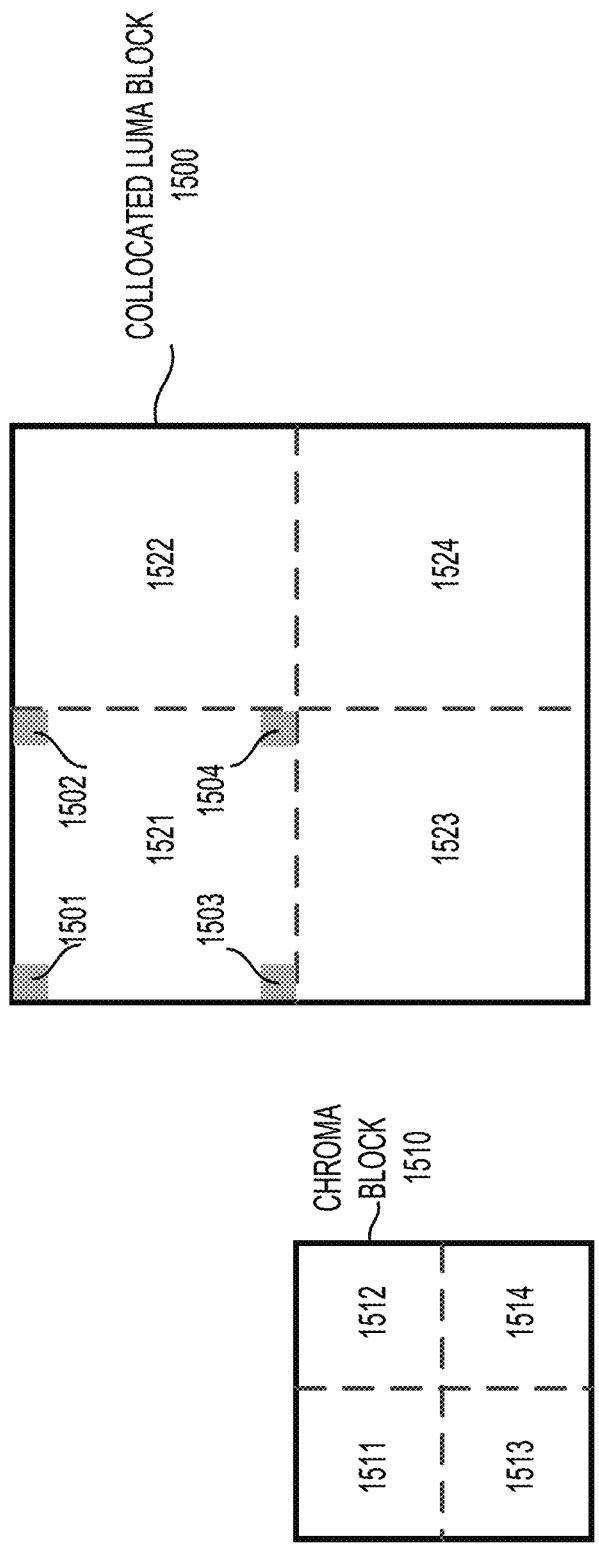
FIG. 15 shows an exemplary chroma block and a collocated luma block.

FIG. 15 shows an example of a chroma block (1510) and a collocated luma block (1500) that is collocated with the chroma block (1510). The chroma block (1510) can be predicted based on the collocated luma block (1500) or a down-sampled luma block that is down-sampled from the collocated luma block (1500), as described in FIG. 14.

The chroma block (1510) includes multiple chroma regions, such as a top-left quarter region (1511), a top-right quarter region (1512), a bottom-left quarter region (1513), and a bottom-right quarter region (1514). An adjustment parameter $y_r$ of each chroma region in the chroma block (1510) can be determined based on an average of certain luma sample values, such as the four luma sample values located at four corners of a corresponding luma region in the collocated luma block (1500).

The collocated luma block (1500) includes multiple luma regions that are collocated with the multiple chroma regions in the chroma block (1510). For example, the multiple luma regions in the collocated luma block (1500) includes a top-left quarter region (1521), a top-right quarter region (1522), a bottom-left quarter region (1523), and a bottom-right quarter region (1524) that are collocated with the top-left quarter region (1511), the top-right quarter region (1512), the bottom-left quarter region (1513), and the bottom-right quarter region (1514) in the chroma block, respectively.

In an example, an average of luma sample values at four corners (1501)-(1504) of the top-left quarter region (1521) of the collocated luma block (1500) is used to determine the adjustment parameter $y_r$ of the top-left quarter region (1511) in the chroma block (1510); an average of luma sample values at four corners of the top-right quarter region (1522) of the collocated luma block (1500) is used to determine the adjustment parameter $y_r$ of the top-right quarter region (1512) in the chroma block (1510); an average of luma sample values at four corners of the bottom-left quarter region (1523) of the collocated luma block (1500) is used to determine the adjustment parameter $y_r$ of the bottom-left quarter region (1513) in the chroma block (1510); and an average of luma sample values at four corners of the bottom-right quarter region (1524) of the collocated luma block (1500) is used to determine the adjustment parameter $y_r$ of the bottom-right quarter region (1514) in the chroma block (1510).

In the descriptions with reference to FIGS. 14-15, the chroma block (e.g., 1410) includes four regions (e.g., (1411)-(1414)). The descriptions in FIGS. 14-15 can be applied to a chroma block when the chroma block includes M number of regions with M being an integer larger than 1.

Referring back to FIG. 14, the regions (1411)-(1414) can be subblocks in the chroma block (1410). An indicator associated with the chroma block (1410) can indicate the CCLM mode for the chroma block (1410). Each subblock in the chroma block (1410) can be predicted differently using the embodiments described in FIG. 14. In an example, a forward transform or an inverse transform is applied to the entire chroma block (1410) to transform the entire chroma block (1410). In an example, the chroma block (1410) is partitioned into multiple TBs that are different from the regions (1411)-(1414), and each of the multiple TBs is transformed using a suitable transform.

As described in FIGS. 14-15, adjustment parameters $y_r$ of different regions (e.g., the regions (1411)-(1414)) in a chroma block (e.g., (1410)) can be different. In an example, a same offset parameter b, such as determined using Eq. 6, is used for the different regions, and corresponding updated offset parameters b' of the different regions can be obtained based on the offset parameter b and the respective adjustment parameters $y_r$ of the different regions. In an example, different offset parameters b can be used for the different regions.

The adjustment parameter u in the adjustment equations (e.g., a'=a+u and b'=b−u×$y_r$) can be derived based on (i) reconstructed neighboring luma samples (e.g., (1020)) of a collocated luma block (e.g., the luma block (1001)) and (ii) collocated luma samples (e.g., (1040)) in the collocated luma block (e.g., the luma block (1001)). According to an embodiment of the disclosure, the adjustment parameter u can be derived based on differences between (i) the reconstructed neighboring luma samples and (ii) the collocated luma samples in the collocated luma block.

In an embodiment, the adjustment parameter u is determined based on a difference between (i) a first average (referred to as Rec_L'(Nei)) based on the reconstructed neighboring luma samples of the collocated luma block and (ii) a second average (referred to as Rec_L'(Col)) based on the collocated luma samples in the collocated luma block. In an example, the adjustment parameter u is a linear function of the difference, such as u=M (Rec_L'(Col)−Rec_L'(Nei))+K, where M and K are constants. In an example, the adjustment parameter u is a piece-wise linear function of the difference, where a mapping table is designed to map a difference of the first average Rec_L'(Nei) and the second Rec_L'(Col)) into a value of the adjustment parameter u.

The first average Rec_L'(Nei) can be an average of a plurality of samples in the reconstructed neighboring luma samples of the collocated luma block. The second average Rec_L'(Col) can be an average of a plurality of samples in the collocated luma samples in the collocated luma block.

In an example, the first average Rec_L'(Nei) is an average of all the reconstructed neighboring luma samples (e.g., (1020)) of the collocated luma block (e.g., (1001)). In an example, the second average Rec_L'(Col) is an average of all the collocated luma samples (e.g., (1040)) in the collocated luma block (e.g., (1001)).

In an embodiment, the reconstructed neighboring luma samples of the collocated luma block used to calculate the first average Rec_L'(Nei) are the selected neighboring samples Rec_L'(i) that are used in calculating the CCLM parameters a and b, such as used in Eqs. 5-6. Referring to FIG. 10, the selected neighboring samples Rec_L'(i) can include a subset of samples in the reconstructed neighboring luma samples (1020), such as the left neighboring luma samples (1022), the top neighboring luma samples (1021), or the like.

In an example, the second average Rec_L'(Col) can be determined based on a subset of the collocated luma samples selected from the collocated luma block. Referring to FIG. 13, one or more of the samples (1301)-(1309) can be used in the selected subset.

In an embodiment, a number of samples used to calculate the second average Rec_L'(Col) is set based on a number of samples used to calculate the first average Rec_L'(Nei). For example, a number of samples used to calculate the second average Rec_L'(Col) is set to be equal to a number of samples used to calculate the first average Rec_L'(Nei).

In some examples, the first average Rec_L'(Nei) is determined based on down-sampled neighboring samples of the reconstructed neighboring luma samples of the collocated luma block.

In an example, a same scaling parameter a, such as determined using Eq. 5, is used for different regions in a chroma block, and corresponding updated scaling parameters a' of the different regions can be obtained based on the scaling parameter a and respective adjustment parameters u of the different regions. In an example, different scaling parameters a can be used for the different regions.

Figure 16:
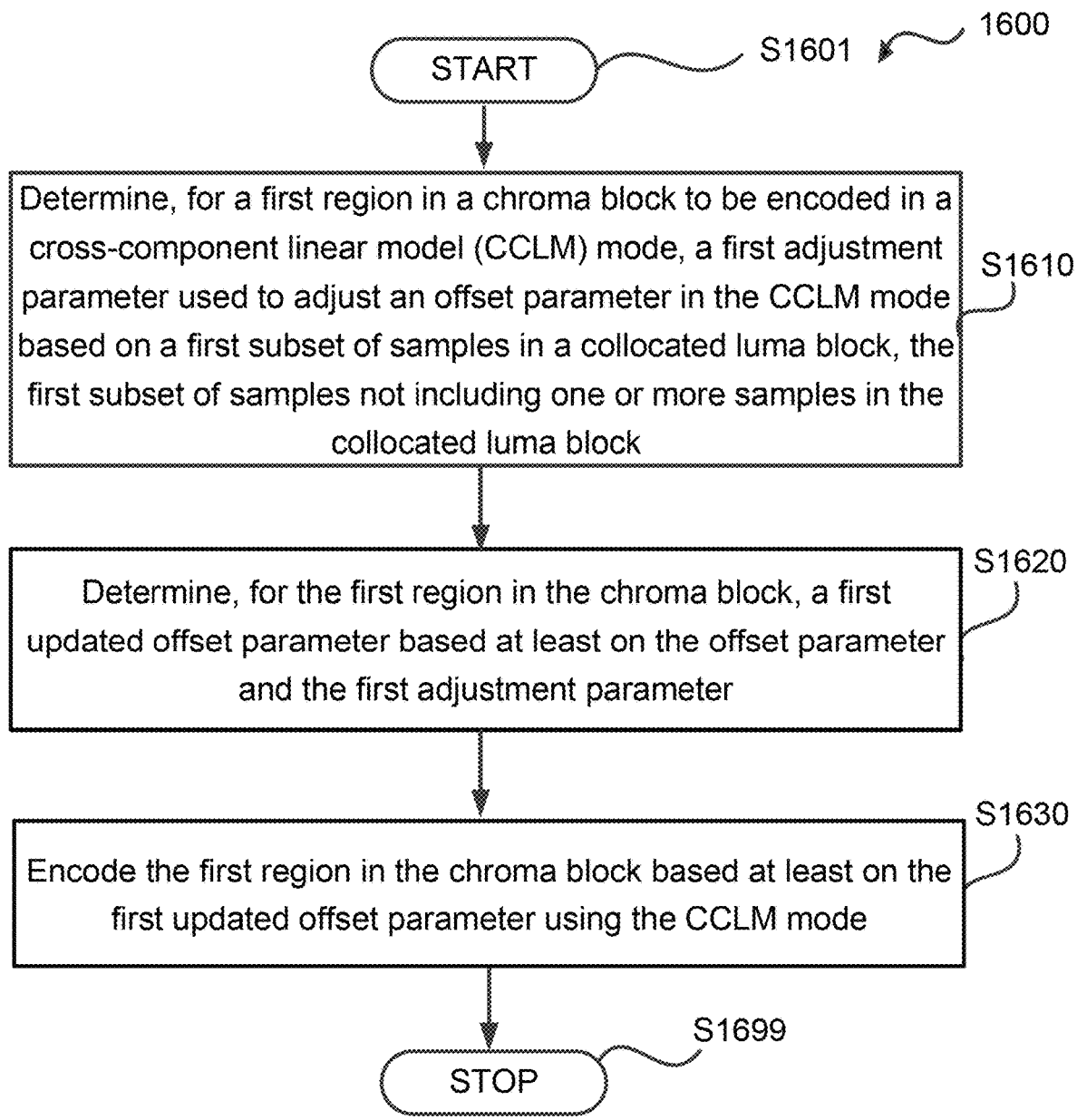
FIG. 16 shows a flow chart outlining an encoding process according to some embodiments of the disclosure.

FIG. 16 shows a flow chart outlining a process (e.g., an encoding process) (1600) according to an embodiment of the disclosure. The process (1600) can be executed by an apparatus for video coding that can include processing circuitry. In various embodiments, the process (1600) is executed by the processing circuitry in the apparatus, such as the processing circuitry in the terminal devices (310), (320), (330) and (340), processing circuitry that performs functions of a video encoder (e.g., (403), (603), (703)), or the like. In some embodiments, the process (1600) is implemented in software instructions, thus when the processing circuitry executes the software instructions, the processing circuitry performs the process (1600). The process starts at (S1601), and proceeds to (S1610).

At (S1610), for a first region in a chroma block to be encoded in a current picture using a cross-component linear model (CCLM) mode, a first adjustment parameter (e.g., $y_r$) used to adjust an offset parameter (e.g., b) in the CCLM mode can be determined based on a first subset of reconstructed samples in a collocated luma block in the current picture. The first subset of the reconstructed samples does not include one or more samples in the collocated luma block.

In an example, the first region in the chroma block includes the entire chroma block. The first subset of the reconstructed samples in the collocated luma block is one sample in the collocated luma block. The first adjustment parameter can be determined to be a sample value of the one sample in the collocated luma block, such as described in FIG. 13.

In an example, the first region includes the entire chroma block. The first subset of the reconstructed samples includes a plurality of samples in the collocated luma block. The first adjustment parameter can be determined to be an average of sample values of the plurality of samples in the collocated luma block, such as described in FIG. 13.

At (S1620), a first updated offset parameter can be determined based at least on the offset parameter and the first adjustment parameter.

At (S1630), the first region can be encoded based at least on the first updated offset parameter using the CCLM mode. In an example, prediction information indicating that the CCLM mode is applied to the chroma block is encoded.

The encoded first region and the prediction information can be included in a coded video bitstream and are sent to a decoder.

In an example, the first region includes the entire chroma block. The prediction information further indicates which of the samples in the collocated luma block is included in the first subset of the reconstructed samples. In an example, which of the samples in the collocated luma block is included in the first subset of the reconstructed samples is signaled in the coded video bitstream.

Then, the process proceeds to (S1699) and terminates.

The process (1600) can be suitably adapted to various scenarios and steps in the process (1600) can be adjusted accordingly. One or more of the steps in the process (1600) can be adapted, omitted, repeated, and/or combined. Any suitable order can be used to implement the process (1600). Additional step(s) can be added.

In an example, the chroma block further includes a second region. The first subset of the reconstructed samples is a first sample in the collocated luma block. For the second region in the chroma block, a second adjustment parameter used to adjust the offset parameter in the CCLM mode can be determined based on a second sample in the collocated luma block. The second sample can be different from the first sample. A second updated offset parameter can be determined based at least on the offset parameter and the second adjustment parameter. The second region in the chroma block can be reconstructed based at least on the second updated offset parameter using the CCLM mode.

In an example, the chroma block further includes the second region. The collocated luma block includes a first luma region and a second luma region that are collocated with the first region and the second region, respectively. The first subset of the reconstructed samples includes a plurality of samples in the first luma region. For the second region in the chroma block, a second adjustment parameter used to adjust the offset parameter in the CCLM mode can be determined based on a plurality of samples in the second luma region. A second updated offset parameter can be determined based at least on the offset parameter and the second adjustment parameter. The second region in the chroma block can be reconstructed based at least on the second updated offset parameter using the CCLM mode.

In an example, the chroma block further includes a second region. The collocated luma block includes a first luma region and a second luma region that are collocated with the first region and the second region, respectively. The first subset of the reconstructed samples includes a top-left sample, a top-right sample, a bottom-left sample, and a bottom-right sample in the first luma region. The first adjustment parameter can be determined to be an average of the top-left sample, the top-right sample, the bottom-left sample, and the bottom-right sample in the first luma region. For the second region in the chroma block, a second adjustment parameter used to adjust the offset parameter in the CCLM mode can be determined to be an average of a top-left sample, a top-right sample, a bottom-left sample, and a bottom-right sample in the second luma region. A second updated offset parameter can be determined based at least on the second offset parameter and the second adjustment parameter. The second region in the chroma block can be reconstructed based at least on the second updated offset parameter using the CCLM mode.

In an example, for the first region, an updated scaling parameter (e.g., a') can be determined to be a sum of a scaling parameter (e.g., the parameter a) used in the CCLM mode and an adjustment parameter (e.g., the adjustment parameter u) used to adjust the scaling parameter. The first updated offset parameter (e.g., b') can be determined to be $(b - u \times y_r)$ where b is the offset parameter, u is the adjustment parameter used to adjust the scaling parameter, and $y_r$ is the first adjustment parameter. The first region in the chroma block can be reconstructed based on the first updated offset parameter and the updated scaling parameter using the CCLM mode.

In an embodiment, for the first region, the adjustment parameter (e.g., u) used to adjust the scaling parameter (e.g., a) is determined based on (i) reconstructed luma samples in one or more neighboring luma blocks of the collocated luma block and (ii) samples in the collocated luma block. In an example, for the first region, the adjustment parameter used to adjust the scaling parameter can be determined based on a difference between an average of the reconstructed luma samples in the one or more neighboring luma blocks and an average of the samples in the collocated luma block.

Figure 17:
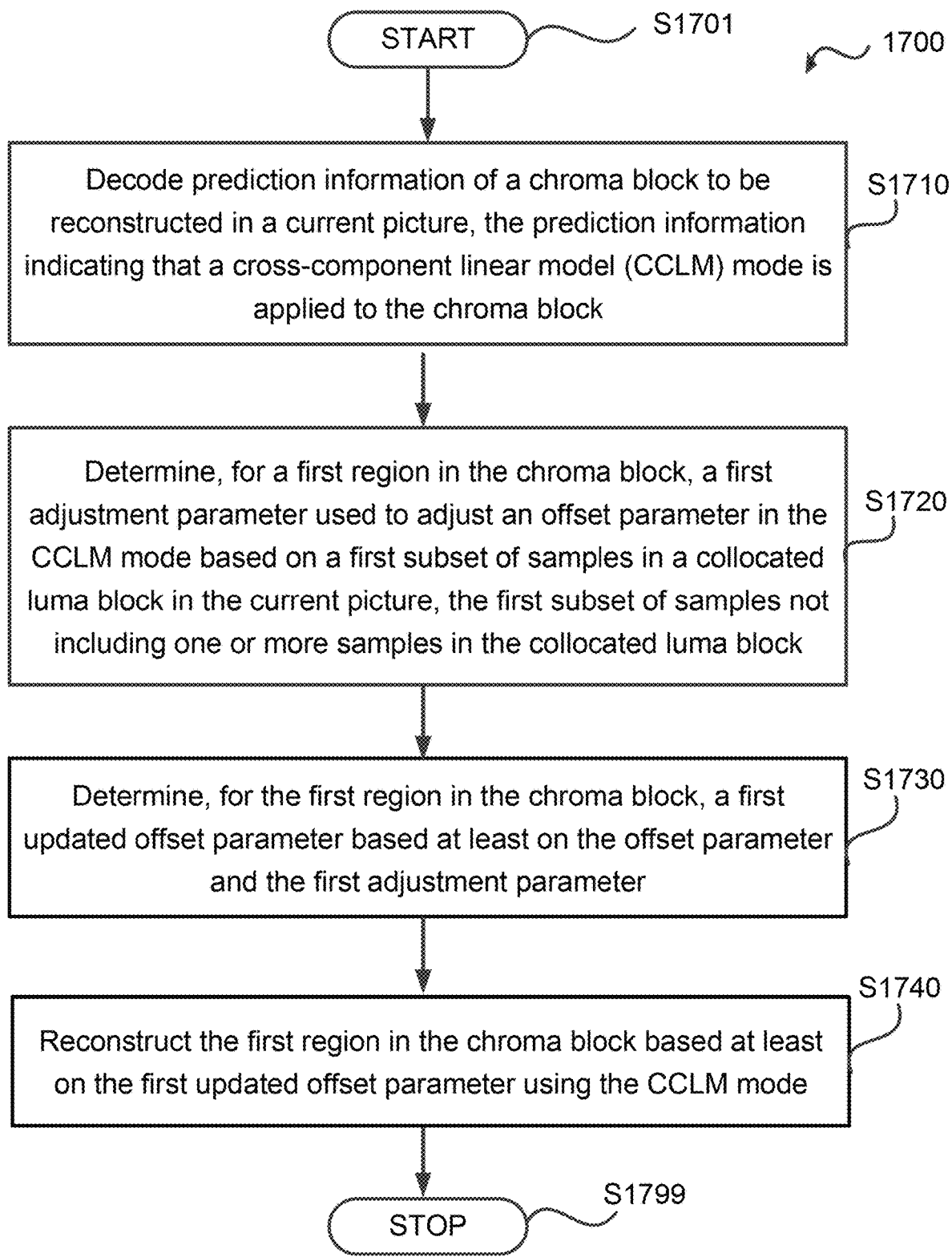
FIG. 17 shows a flow chart outlining a decoding process according to some embodiments of the disclosure.

FIG. 17 shows a flow chart outlining a process (e.g., a decoding process) (1700) according to an embodiment of the disclosure. The process (1700) can be used in a video decoder. The process (1700) can be executed by an apparatus for video coding that can include receiving circuitry and processing circuitry. The processing circuitry in the apparatus, such as the processing circuitry in the terminal devices (310), (320), (330) and (340), the processing circuitry that performs functions of the video decoder (410), the processing circuitry that performs functions of the video decoder (510), and the like can be configured to perform the process (1700). In some examples, the process (1700) is used in a video encoder (e.g., the video encoder (403), the video encoder (603)). In an example, the process (1700) is executed by processing circuitry that performs functions of an video encoder (e.g., the video encoder (403), the video encoder (603)). In some embodiments, the process (1700) is implemented in software instructions, thus when the processing circuitry executes the software instructions, the processing circuitry performs the process (1700). The process starts at (S1701) and proceeds to (S1710).

At (S1710), prediction information of a chroma block to be reconstructed in a current picture can be decoded. The prediction information can indicate that a cross-component linear model (CCLM) mode is applied to the chroma block.

At (S1720), for a first region in the chroma block, a first adjustment parameter (also referred to as a first adjustment value) (e.g., $y_r$) used to adjust (or modify) an offset parameter (e.g., b) in the CCLM mode can be determined based on a first subset of samples (or reconstructed samples) in a collocated luma block in the current picture. The collocated luma block is a luma block that is collocated with the chroma block. The first subset of samples does not include one or more samples in the collocated luma block. In an example, the samples in the collocated luma block are already reconstructed.

In an example, the first region in the chroma block includes the entire chroma block. The first subset of samples in the collocated luma block is one sample in the collocated luma block. The first adjustment parameter can be determined to be a sample value of the one sample in the collocated luma block, such as described in FIG. 13.

In an example, the first region includes the entire chroma block. The first subset of samples includes a plurality of samples in the collocated luma block. The first adjustment parameter can be determined to be an average of sample values of the plurality of samples in the collocated luma block, such as described in FIG. 13.

In an example, the first region includes the entire chroma block. The prediction information further indicates which of the samples in the collocated luma block is included in the first subset of samples. In an example, which of the samples in the collocated luma block is included in the first subset of samples is signaled in the coded video bitstream. In an example, which of the samples in the collocated luma block is included in the first subset of samples is derived.

At (S1730), for the first region in the chroma block, a first updated offset parameter (e.g., b') can be determined based at least on the offset parameter (e.g., b) and the first adjustment parameter (e.g., $y_r$), such as b'=b−u×$y_r$ as described above.

At (S1740), the first region in the chroma block can be reconstructed based at least on the first updated offset parameter using the CCLM mode. Then, the process proceeds to (S1799) and terminates.

The process (1700) can be suitably adapted to various scenarios and steps in the process (1700) can be adjusted accordingly. One or more of the steps in the process (1700) can be adapted, omitted, repeated, and/or combined. Any suitable order can be used to implement the process (1700). Additional step(s) can be added.

In an example, the chroma block further includes a second region. The first subset of samples is a first sample in the collocated luma block. For the second region in the chroma block, a second adjustment parameter used to adjust the offset parameter in the CCLM mode can be determined based on a second sample in the collocated luma block. The second sample can be different from the first sample. A second updated offset parameter can be determined based at least on the offset parameter and the second adjustment parameter. The second region in the chroma block can be reconstructed based at least on the second updated offset parameter using the CCLM mode.

In an example, the chroma block further includes the second region. The collocated luma block includes a first luma region and a second luma region that are collocated with the first region and the second region, respectively. The first subset of samples includes a plurality of samples in the first luma region. For the second region in the chroma block, a second adjustment parameter used to adjust the offset parameter in the CCLM mode can be determined based on a plurality of samples in the second luma region. A second updated offset parameter can be determined based at least on the offset parameter and the second adjustment parameter. The second region in the chroma block can be reconstructed based at least on the second updated offset parameter using the CCLM mode.

In an example, the chroma block further includes a second region. The collocated luma block includes a first luma region and a second luma region that are collocated with the first region and the second region, respectively. The first subset of samples includes a top-left sample, a top-right sample, a bottom-left sample, and a bottom-right sample in the first luma region. The first adjustment parameter can be determined to be an average of the top-left sample, the top-right sample, the bottom-left sample, and the bottom-right sample in the first luma region. For the second region in the chroma block, a second adjustment parameter used to adjust the offset parameter in the CCLM mode can be determined to be an average of a top-left sample, a top-right sample, a bottom-left sample, and a bottom-right sample in the second luma region. A second updated offset parameter can be determined based at least on the second offset parameter and the second adjustment parameter. The second region in the chroma block can be reconstructed based at least on the second updated offset parameter using the CCLM mode.

In an example, for the first region, an updated scaling parameter (e.g., a') can be determined to be a sum of a scaling parameter (also referred to as a slope parameter) (e.g., the parameter a) used in the CCLM mode and an adjustment parameter (also referred to as an adjustment value) (e.g., the adjustment parameter u) used to adjust the scaling parameter. The first updated offset parameter (e.g., b') can be determined to be (b−u×$y_r$) where b is the offset parameter, u is the adjustment parameter used to adjust the scaling parameter, and $y_r$ is the first adjustment parameter. The first region in the chroma block can be reconstructed based on the first updated offset parameter and the updated scaling parameter using the CCLM mode.

In an embodiment, for the first region, the adjustment parameter (e.g., u) used to adjust the scaling parameter (e.g., a) is determined based on (i) reconstructed luma samples in one or more neighboring luma blocks of the collocated luma block and (ii) samples in the collocated luma block. In an example, for the first region, the adjustment parameter used to adjust the scaling parameter can be determined based on a difference between an average of the reconstructed luma samples in the one or more neighboring luma blocks and an average of the samples in the collocated luma block.

In an embodiment, for a first region in the chroma block, a first adjustment value used to modify an offset parameter in the CCLM mode is determined based on a first subset of reconstructed samples in a luma block that is collocated with the chroma block in the current picture. The first subset of the reconstructed samples does not include one or more samples in the luma block. The offset parameter can be updated based at least on the first adjustment value. A second adjustment value used to modify a slope parameter in the CCLM mode can be determined based on a second subset of the reconstructed samples in the luma block and updates the slope parameter based at least on the second adjustment value. The first region in the chroma block can be reconstructed based at least on the updated offset parameter and the updated slope parameter using the CCLM mode.

In an example, the second subset of the reconstructed samples includes the first subset of the reconstructed samples.

In an example, the second adjustment value is determined based on the reconstructed samples in the entire luma block.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 18 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 18:
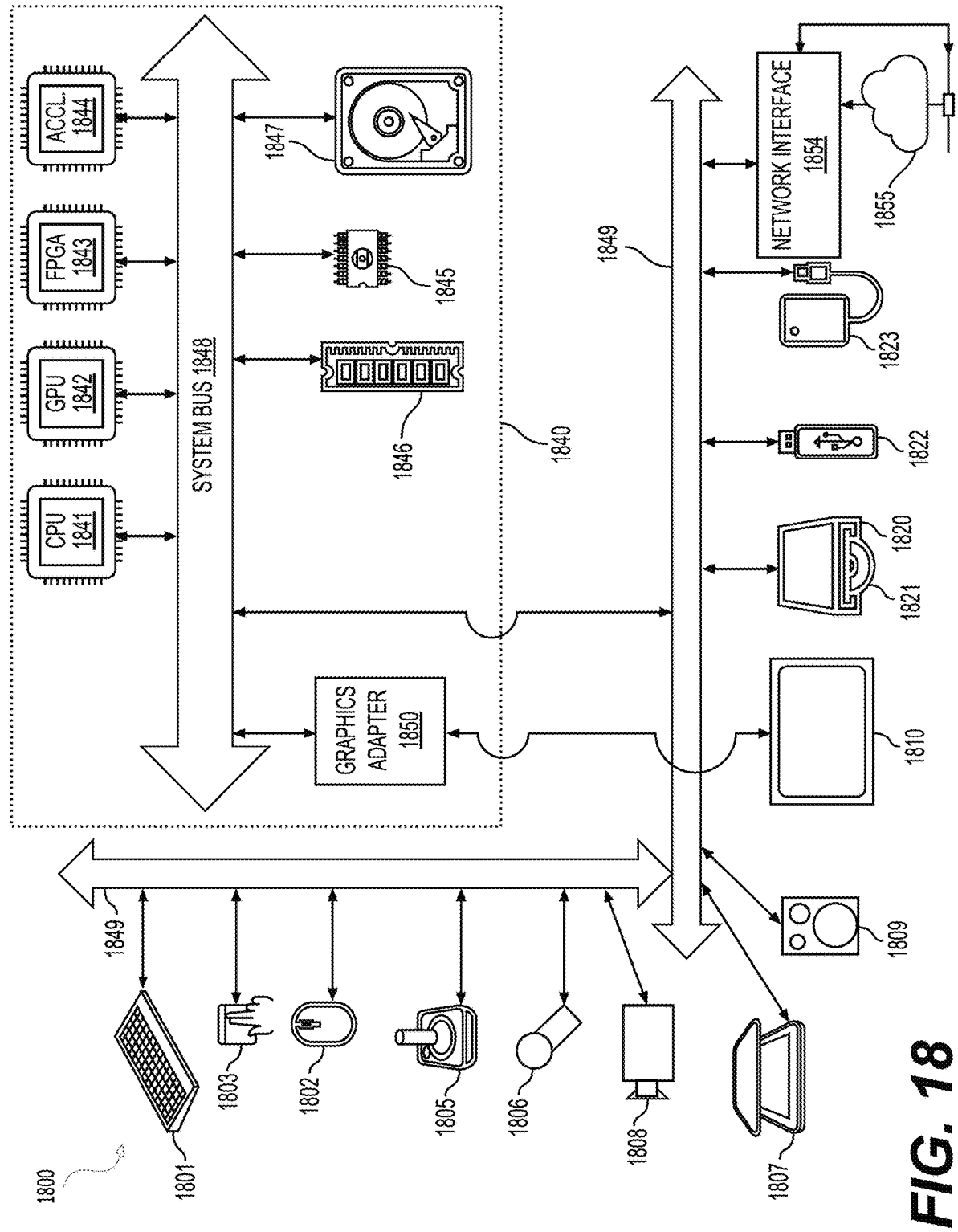
FIG. 18 is a schematic illustration of a computer system in accordance with an embodiment.

The components shown in FIG. 18 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1849) (such as, for example USB ports of the computer system (1800)); others are commonly integrated into the core of the computer system (1800) by attachment to a system bus as described below (for example Ethernet interface into a PC computer system or cellular network interface into a smart-phone computer system). Using any of these networks, computer system (1800) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

CPUs (1841), GPUs (1842), FPGAs (1843), and accelerators (1844) can execute certain instructions that, in combination, can make up the aforementioned computer code. That computer code can be stored in ROM (1845) or RAM (1846). Transitional data can be also be stored in RAM (1846), whereas permanent data can be stored for example, in the internal mass storage (1847). Fast storage and retrieve to any of the memory devices can be enabled through the use of cache memory, that can be closely associated with one or more CPU (1841), GPU (1842), mass storage (1847), ROM (1845), RAM (1846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1800), and specifically the core (1840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1840) that are of non-transitory nature, such as core-internal mass storage (1847) or ROM (1845). The software implementing various embodiments of the present disclosure can be stored in such devices and executed by core (1840). A computer-readable medium can include one or more memory devices or chips, according to particular needs. The software can cause the core (1840) and specifically the processors therein (including CPU, GPU, FPGA, and the like) to execute particular processes or particular parts of particular processes described herein, including defining data structures stored in RAM (1846) and modifying such data structures according to the processes defined by the software. In addition or as an alternative, the computer system can provide functionality as a result of logic hardwired or otherwise embodied in a circuit (for example: accelerator (1844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

APPENDIX A: ACRONYMS

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
CCLM: cross-component linear model While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video processing in an encoder, comprising:
   for a first region in a chroma block in a current picture, updating an offset parameter in a cross-component linear model (CCLM) mode based on a first subset of reconstructed samples in a luma block that is collocated with the chroma block in the current picture, the first subset of the reconstructed samples not including one or more reconstructed samples in the luma block;
   updating a slope parameter in the CCLM mode based on a second subset of the reconstructed samples in the luma block; and
   encoding the first region in the chroma block based on the updated offset parameter and the updated slope parameter using the CCLM mode.

2. The method of claim 1, wherein
   the first region in the chroma block includes the entire chroma block;
   the first subset of the reconstructed samples in the luma block is one reconstructed sample in the luma block; and
   the updating the offset parameter includes updating the offset parameter based on a sample value of the one reconstructed sample in the luma block.

3. The method of claim 1, wherein
   the first region includes the entire chroma block;
   the first subset of the reconstructed samples includes a plurality of reconstructed samples in the luma block, and
   the updating the offset parameter includes updating the offset parameter based on an average of sample values of the plurality of reconstructed samples in the luma block.

4. The method of claim 1, wherein
   the first region includes the entire chroma block; and
   the method further includes encoding prediction information that indicates which of the reconstructed samples in the luma block is included in the first subset of the reconstructed samples.

5. The method of claim 1, wherein
   the chroma block further includes a second region;
   the first subset of the reconstructed samples is a first reconstructed sample in the luma block, and
   for the second region in the chroma block, the method includes
      determining an adjustment parameter used to adjust the offset parameter in the CCLM mode based on a second reconstructed sample in the luma block, the second reconstructed sample being different from the first reconstructed sample;
      determining a second updated offset parameter based on the offset parameter and the adjustment parameter; and
      encoding the second region in the chroma block based on the second updated offset parameter using the CCLM mode.

6. The method of claim 1, wherein
   the chroma block further includes a second region;
   the luma block includes a first luma region and a second luma region that are collocated with the first region and the second region, respectively;
   the first subset of the reconstructed samples includes a plurality of reconstructed samples in the first luma region; and
   for the second region in the chroma block, the method includes determining an adjustment parameter used to adjust the offset parameter in the CCLM mode based on a plurality of reconstructed samples in the second luma region;

determining a second updated offset parameter based on the offset parameter and the adjustment parameter; and encoding the second region in the chroma block based on the second updated offset parameter using the CCLM mode.

7. The method of claim 1, wherein the chroma block further includes a second region;

the luma block includes a first luma region and a second luma region that are collocated with the first region and the second region, respectively;

the first subset of the reconstructed samples includes a top-left sample, a top-right sample, a bottom-left sample, and a bottom-right sample in the first luma region;

the updating the offset parameter includes updating the offset parameter based on an average of the top-left sample, the top-right sample, the bottom-left sample, and the bottom-right sample in the first luma region; and for the second region in the chroma block, the method includes determining an adjustment parameter used to adjust the offset parameter in the CCLM mode based on an average of a top-left sample, a top-right sample, a bottom-left sample, and a bottom-right sample in the second luma region;

determining a second updated offset parameter based on the offset parameter and the adjustment parameter; and encoding the second region in the chroma block based on the second updated offset parameter using the CCLM mode.

8. The method of claim 1, wherein the updating the offset parameter includes updating the offset parameter to be (b—u× $y_r$), b being the offset parameter, u being determined based on the second subset of the reconstructed samples, $y_r$ being determined based on the first subset of reconstructed samples;

the updating the slope parameter includes updating the slope parameter as (a+u), a being the slope parameter; and the encoding the first region includes encoding the first region in the chroma block based on the updated offset parameter and the updated slope parameter using the CCLM mode.

9. The method of claim 8, further comprising:

for the first region, determining u based on (i) reconstructed luma samples in one or more neighboring luma blocks of the luma block and (ii) the second subset of the reconstructed samples in the luma block.

10. The method of claim 9, wherein the determining u comprises:

for the first region, determining u based on a difference between an average of the reconstructed luma samples in the one or more neighboring luma blocks and an average of the second subset of the reconstructed samples in the luma block.

11. The method of claim 1, wherein the second subset of the reconstructed samples includes the first subset of the reconstructed samples.

12. The method of claim 1, wherein the updating the slope parameter comprises:

determining the slope parameter based on the reconstructed samples in the entire luma block.

13. An apparatus for video decoding, comprising:

processing circuitry configured to:

decode prediction information of a chroma block to be reconstructed in a current picture, the prediction information indicating that a cross-component linear model (CCLM) mode is applied to the chroma block; and for a first region in the chroma block, update an offset parameter in the CCLM mode based on a first subset of reconstructed samples in a luma block that is collocated with the chroma block in the current picture, the first subset of the reconstructed samples not including one or more reconstructed samples in the luma block;

update a slope parameter in the CCLM mode based on a second subset of the reconstructed samples in the luma block; and reconstruct the first region in the chroma block based on the updated offset parameter and the updated slope parameter using the CCLM mode.

14. The apparatus of claim 13, wherein the first region in the chroma block includes the entire chroma block;

the first subset of the reconstructed samples in the luma block is one reconstructed sample in the luma block; and the processing circuitry is configured to update the offset parameter based on a sample value of the one reconstructed sample in the luma block.

15. The apparatus of claim 13, wherein the first region includes the entire chroma block;

the first subset of the reconstructed samples includes a plurality of reconstructed samples in the luma block, and the processing circuitry is configured to update the offset parameter based on an average of sample values of the plurality of reconstructed samples in the luma block.

16. The apparatus of claim 13, wherein the first region includes the entire chroma block; and the processing circuitry is configured to encode prediction information that indicates which of the reconstructed samples in the luma block is included in the first subset of the reconstructed samples.

17. The apparatus of claim 13, wherein the chroma block further includes a second region;

the first subset of the reconstructed samples is a first reconstructed sample in the luma block, and for the second region in the chroma block, the processing circuitry is configured to:

determine an adjustment parameter used to adjust the offset parameter in the CCLM mode based on a second reconstructed sample in the luma block, the second reconstructed sample being different from the first reconstructed sample;

determine a second updated offset parameter based on the offset parameter and the adjustment parameter; and reconstruct the second region in the chroma block based on the second updated offset parameter using the CCLM mode.

18. The apparatus of claim 13, wherein the chroma block further includes a second region;

the luma block includes a first luma region and a second luma region that are collocated with the first region and the second region, respectively;

the first subset of the reconstructed samples includes a plurality of reconstructed samples in the first luma region; and for the second region in the chroma block, the processing circuitry is configured to:
  determine an adjustment parameter used to adjust the offset parameter in the CCLM mode based on a plurality of reconstructed samples in the second luma region;
  determine a second updated offset parameter based on the offset parameter and the adjustment parameter; and
  reconstruct the second region in the chroma block based on the second updated offset parameter using the CCLM mode.

19. The apparatus of claim 13, wherein
the chroma block further includes a second region;
the luma block includes a first luma region and a second luma region that are collocated with the first region and the second region, respectively;
the first subset of the reconstructed samples includes a top-left sample, a top-right sample, a bottom-left sample, and a bottom-right sample in the first luma region; and
the processing circuitry is configured to:
  update the offset parameter based on an average of the top-left sample, the top-right sample, the bottom-left sample, and the bottom-right sample in the first luma region; and
  for the second region in the chroma block,
    determine an adjustment parameter used to adjust the offset parameter in the CCLM mode based on an average of a top-left sample, a top-right sample, a bottom-left sample, and a bottom-right sample in the second luma region;
    determine a second updated offset parameter based on the offset parameter and the adjustment parameter; and
    reconstruct the second region in the chroma block based on the second updated offset parameter using the CCLM mode.

20. A non-transitory computer-readable storage medium storing a video bitstream that is generated by a video encoding method, executed by a processor, the video encoding method comprising:
  for a first region in a chroma block in a current picture,
    updating an offset parameter in a cross-component linear model (CCLM) mode based on a first subset of reconstructed samples in a luma block that is collocated with the chroma block in the current picture, the first subset of the reconstructed samples not including one or more reconstructed samples in the luma block;
    updating a slope parameter in the CCLM mode based on a second subset of the reconstructed samples in the luma block; and
    encoding the first region in the chroma block based on the updated offset parameter and the updated slope parameter using the CCLM mode.

* * * * *